(12) United States Patent
Anzai et al.

(10) Patent No.: US 7,771,137 B2
(45) Date of Patent: Aug. 10, 2010

(54) CONNECTING STRUCTURE FOR HOLLOW MEMBER OR HALF HOLLOW MEMBER

(75) Inventors: Eiji Anzai, Shizuoka (JP); Yunosuke Yamada, Tokyo (JP); Yoshihiro Konno, Tokyo (JP); Yuki Murayama, Kanagawa (JP)

(73) Assignees: Nissan Motor Co., Ltd., Yokohama-shi (JP); Nippon Light Metal Company, Ltd., Tokyo (JP)

( * ) Notice: Subject to any disclaimer, the term of this patent is extended or adjusted under 35 U.S.C. 154(b) by 1061 days.

(21) Appl. No.: 11/451,559

(22) Filed: Jun. 13, 2006

(65) Prior Publication Data

US 2006/0278463 A1   Dec. 14, 2006

(30) Foreign Application Priority Data

| Jun. 14, 2005 | (JP) | ............................. 2005-173480 |
| Jun. 21, 2005 | (JP) | ............................. 2005-180121 |
| Jun. 21, 2005 | (JP) | ............................. 2005-180850 |

(51) Int. Cl.
  *F16B 7/10* (2006.01)
  *B60G 7/02* (2006.01)

(52) U.S. Cl. ............. 403/379.3; 403/378; 280/124.109; 180/232

(58) Field of Classification Search ................ 403/217, 403/238, 264, 283, 292, 294, 301, 306, 308, 403/388, 393, 408.1, DIG. 1, 378, 379.3, 403/379.4, 379.5; 180/232, 312; 280/124.109, 280/781, 784, 788, 797; 52/653.2, 655.1, 52/656.9; 428/99, 133; 108/51.1, 51.11, 108/56.1, 56.13, 57.22, 57.26, 901

See application file for complete search history.

(56) References Cited

U.S. PATENT DOCUMENTS

| 1,896,530 | A | * | 2/1933 | Trout ......................... 403/174 |
| 2,177,896 | A | * | 10/1939 | Lee ............................. 296/205 |
| 2,296,181 | A | * | 9/1942 | Perkins ....................... 180/312 |
| 3,341,514 | A | * | 9/1967 | Ivanhoe et al ............... 534/604 |
| 3,342,514 | A | * | 9/1967 | Ivanhoe et al. .............. 403/295 |
| 3,415,554 | A | * | 12/1968 | Papayoti ..................... 403/187 |

(Continued)

FOREIGN PATENT DOCUMENTS

DE    102 58 108 A1    6/2004

(Continued)

*Primary Examiner*—Michael P Ferguson
*Assistant Examiner*—Jay R Ripley
(74) *Attorney, Agent, or Firm*—Foley & Lardner LLP

(57) ABSTRACT

A connecting structure includes a hollow member or a half hollow member including two side portions opposed apart to each other; a collar; and a bolt. The collar includes two contact surfaces at both ends of the collar. The two contact surfaces are adapted to respectively abut on the two side portions between the two side portions. At least one of the two contact surfaces is formed with a receiving portion for caulking. Moreover, the collar is formed with a bolt-hole passing through the two contact surfaces. The collar is disposed between the two side portions, and is caulked with the hollow member or half hollow member at a caulked portion formed from at least one of the two side portions toward the receiving portion. The bolt is adapted to pass through the two side portions and the bolt-hole to connect the hollow member or half hollow member with another member.

11 Claims, 19 Drawing Sheets

U.S. PATENT DOCUMENTS

| | | | |
|---|---|---|---|
| 3,685,854 A * | 8/1972 | Cadiou | 180/90.6 |
| 4,323,163 A * | 4/1982 | Johns | 211/189 |
| 5,005,887 A * | 4/1991 | Kelman | 293/120 |
| 5,259,660 A | 11/1993 | Haesters | |
| 5,269,584 A * | 12/1993 | Takagi | 296/30 |
| 5,957,425 A * | 9/1999 | Conway et al. | 248/548 |
| 6,165,588 A * | 12/2000 | Wycech | 428/122 |
| 6,237,304 B1 * | 5/2001 | Wycech | 52/847 |
| 6,269,902 B1 | 8/2001 | Miyagawa | |
| 6,408,974 B1 * | 6/2002 | Viduya et al. | 180/312 |
| 6,416,119 B1 * | 7/2002 | Gericke et al. | 296/205 |
| 6,733,040 B1 * | 5/2004 | Simboli | 280/800 |
| 7,201,398 B1 * | 4/2007 | Christofaro et al. | 280/781 |

FOREIGN PATENT DOCUMENTS

| | | |
|---|---|---|
| GB | 2 109 433 A | 6/1983 |
| JP | 2000-238657 A | 9/2000 |

* cited by examiner

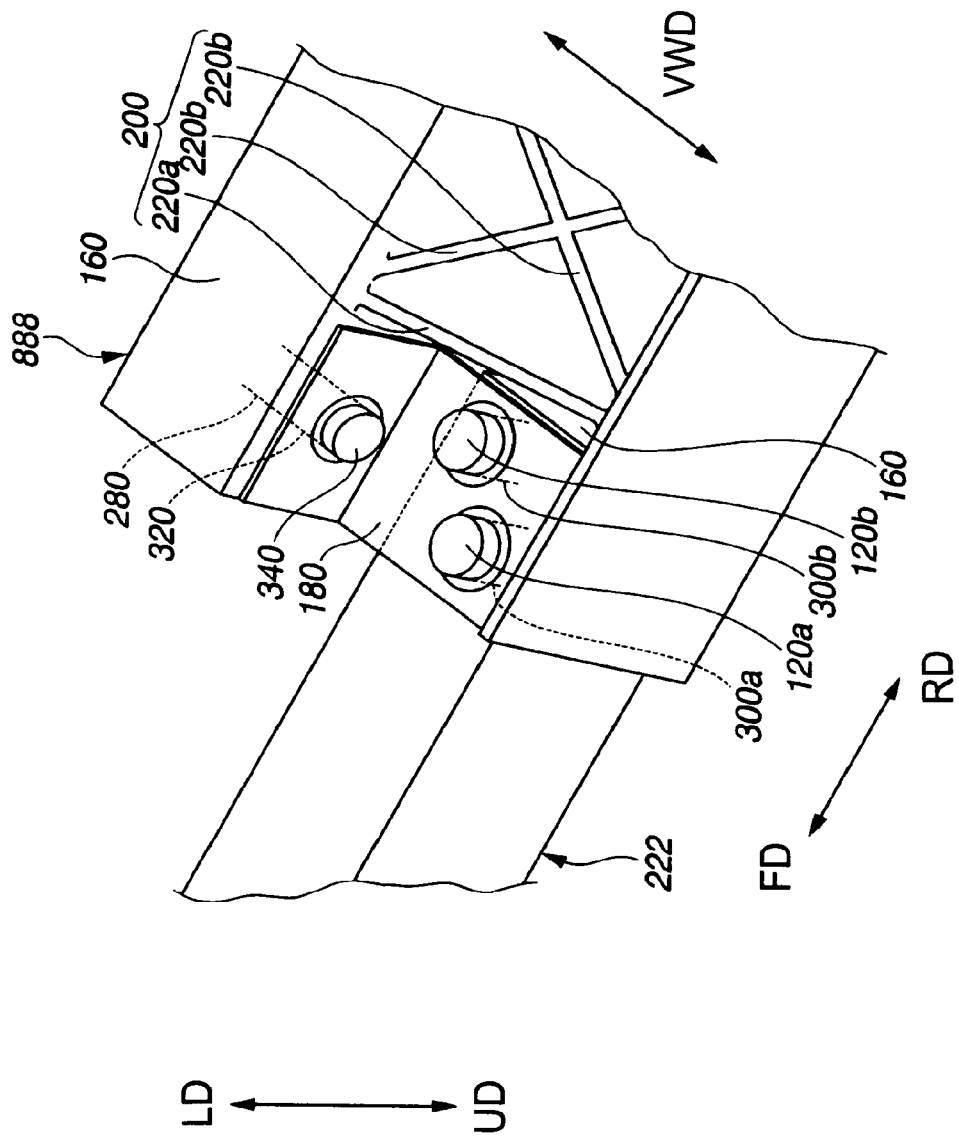

CONNECTING STRUCTURE FOR HOLLOW MEMBER OR HALF HOLLOW MEMBER

BACKGROUND OF THE INVENTION

The present invention relates to a connecting structure and/or method for a hollow member or a half hollow member, more particularly relates to a connecting structure in which a bolt and a nut are used for fixing a hollow member or a half hollow member to the other member(s).

Generally, in the case where a hollow member or half hollow member is fixed with the other member by a nut and a bolt having the length capable of passing through opposed two side portions of the hollow member or half hollow member, the hollow member or half hollow member is fixed with the other member by using a collar interposed between the two side portions of the hollow member or half hollow member. This is conducted in order not to vary a space (distance) between the two side portions of the hollow member or half hollow member due to a fastening force of the nut and bolt.

Japanese Patent Application Publication No. 2000-238657 discloses a connecting structure in which a through hole is provided at a predetermined point of a hollow member, and then a collar is inserted at the point of through hole and is fixed with the hollow member by means of welding. Under this situation, the hollow member is fixed with the other member by inserting a bolt into the collar. Alternatively under this situation, the hollow member is fixed with the other member, by inserting a bolt into the collar through a pair of brackets which have concave cross sections and which are provided to straddle the hollow member and to sandwich the collar in an upper-lower direction, and then by tightening a nut on the bolt. In this case, the collar is simply shaped like a circular cylinder, and only one bolt is used for the fixing.

SUMMARY OF THE INVENTION

However in the case of above Japanese Patent Application, an expense in time and effort is necessary at the time of attachment of the collar; since the collar is inserted through the hollow member or the brackets provided to straddle the hollow member, and then is welded. Moreover, the structure in which the hollow member is connected with the other member by inserting the bolt through the collar passing through the hollow member is not a structure constructed for solidly fixing the hollow member, since only the collar is in contact with the other member. Furthermore, since the collar is formed simply in a circular cylindrical shape, the collar can be used for only one bolt. Hence, a plurality of collars need to be welded in the case where the usage of a plurality of bolts is necessary.

Moreover, in related fields of motor vehicle; a suspension member constituting a suspension is connected with a supporting member for supporting the vehicle-body side of a suspension arm. Also, an engine, a transmission, and the like are mounted on the suspension member. It is conceivable that the usage of an aluminium material is of benefit for the forming of suspension member, in view of weight reduction. For example, in the suspension member, an optimal connecting structure for a hollow member or a half hollow member is needed.

It is an object of the present invention to provide a connecting structure for a hollow member or a half hollow member, devised to reduce constructional elements and to fix the collar easily and reliably.

According to one aspect of the present invention, there is provided a connecting structure comprising: a hollow member or a half hollow member including two side portions opposed apart to each other; a collar including two contact surfaces at both ends of the collar, the two contact surfaces being adapted to respectively abut on the two side portions between the two side portions, at least one of the two contact surfaces being formed with a receiving portion for caulking; being formed with a bolt-hole passing through the two contact surfaces; being disposed between the two side portions; and being caulked with the hollow member or half hollow member at a caulked portion formed from at least one of the two side portions toward the receiving portion; and a bolt adapted to pass through the two side portions and the bolt-hole to connect the hollow member or half hollow member with another member.

According to another aspect of the present invention, there is provided a method of connecting a hollow member or a half hollow member including two side portions opposed apart to each other with another member, the method comprising: disposing a collar between the two side portions, the collar including two contact surfaces at both ends of the collar, the two contact surfaces being adapted to respectively abut on the two side portions between the two side portions, at least one of the two contact surfaces being formed with a receiving portion for caulking, and being formed with a bolt-hole passing through the two contact surfaces; forming a caulked portion from at least one of the two side portions toward the receiving portion to temporarily join the collar into the hollow member or half hollow member; and fastening the hollow member or half hollow member with the another member by a bolt passing through the two side portions and the bolt-hole.

The other objects and features of this invention will become understood from the following description with reference to the accompanying drawings.

BRIEF DESCRIPTION OF THE DRAWINGS

FIG. 23 is an oblique perspective view of FIG. 22.

DETAILED DESCRIPTION OF THE INVENTION

Reference will hereinafter be made to the drawings in order to facilitate a better understanding of the present invention.

First Embodiment

Figure 1:
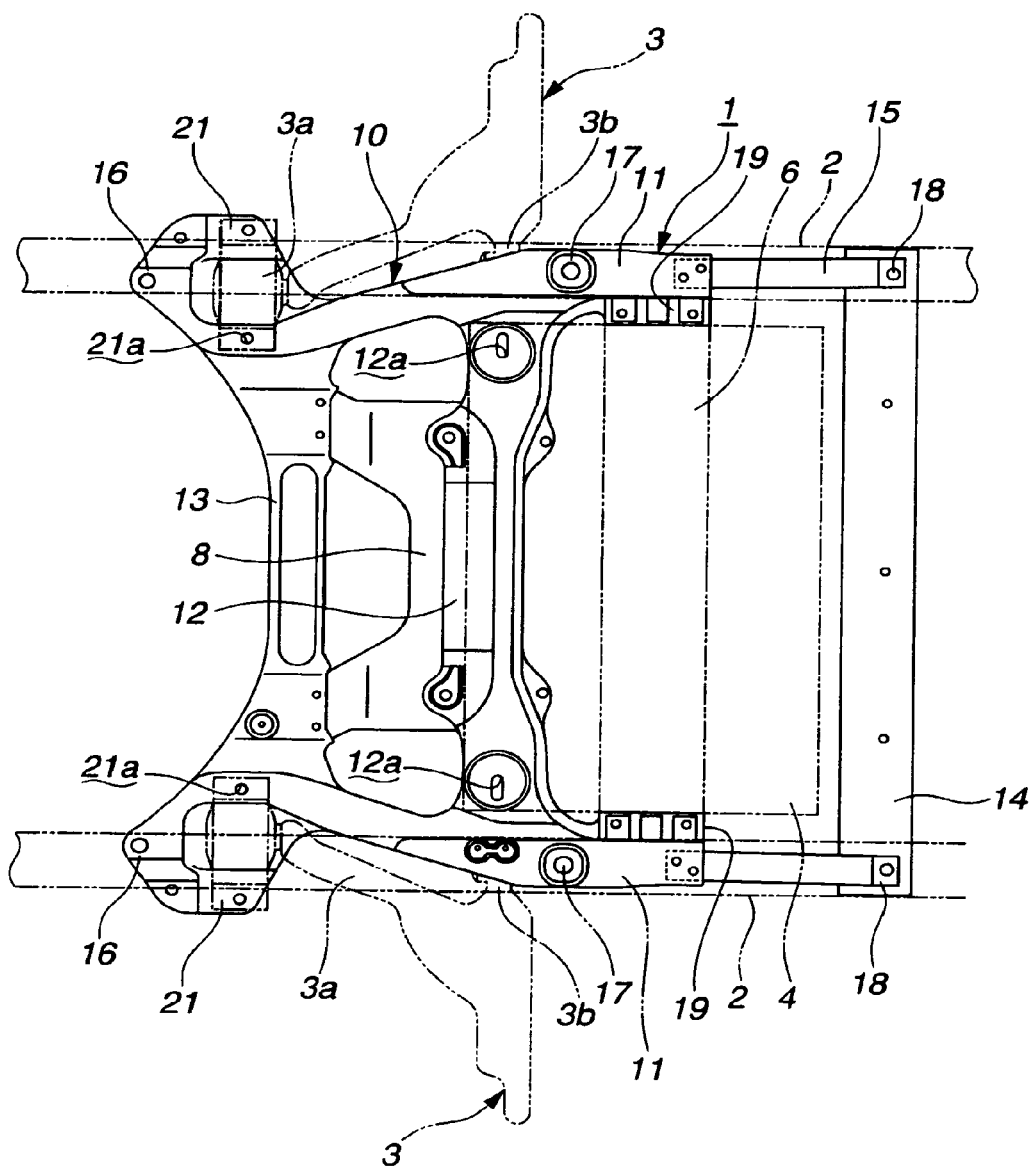
FIG. 1 is a schematic plan view showing a suspension member to which a connecting structure for a hollow member or a half hollow member is applied in a first embodiment according to the present invention.
Figure 2:
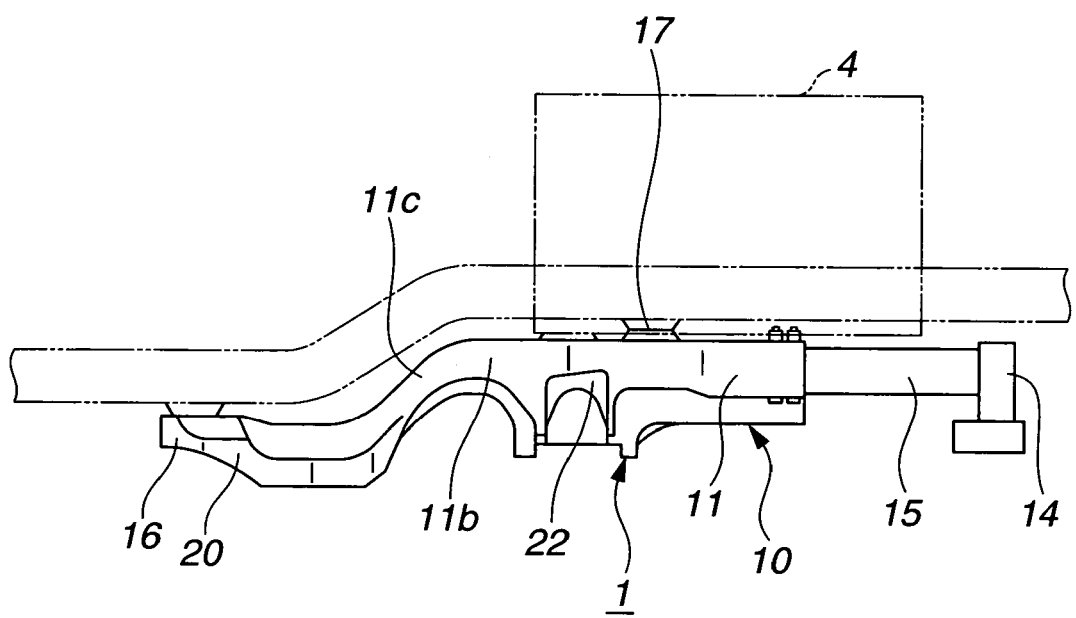
FIG. 2 is a side view of the suspension member shown in FIG. 1.
Figure 3:
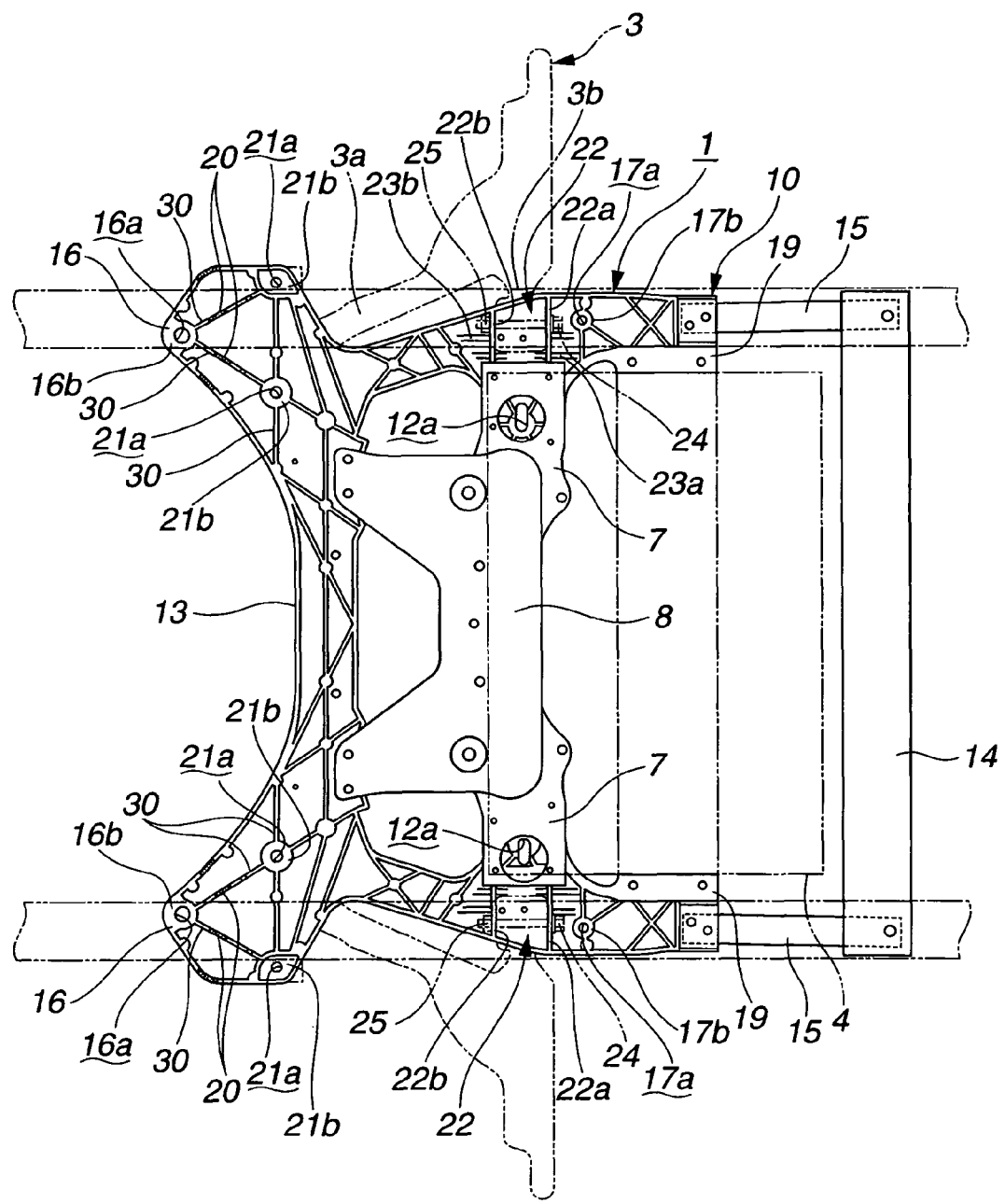
FIG. 3 is a bottom view of the suspension member shown in FIG. 1.
Figure 4:
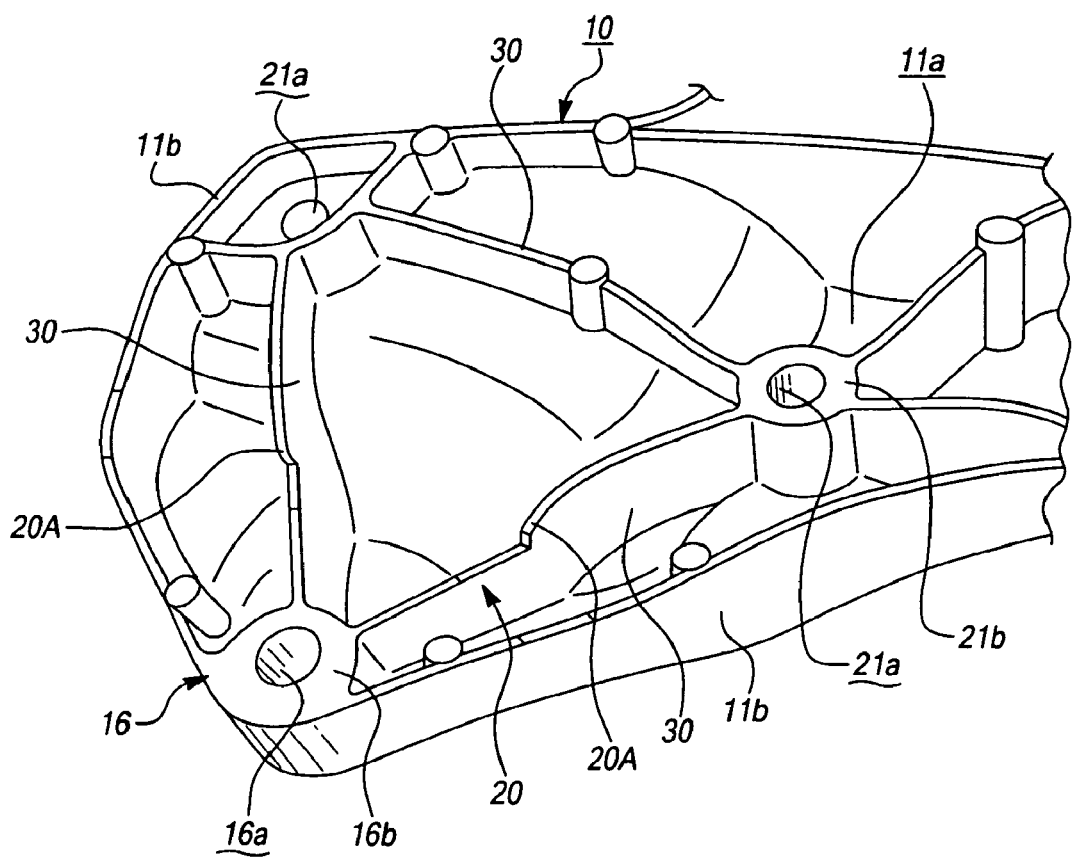
FIG. 4 is a bottom and oblique perspective view showing a rupture inducing portion and a vehicle-interior side connecting portion of the suspension member, in the first embodiment.
Figure 5:
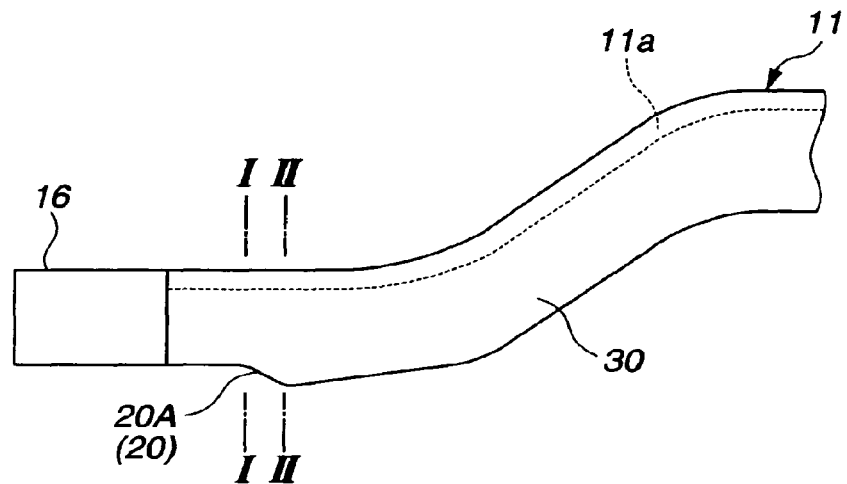
FIG. 5 is an enlarged side view of a first example of the rupture inducing portion in the first embodiment.
Figure 7A:
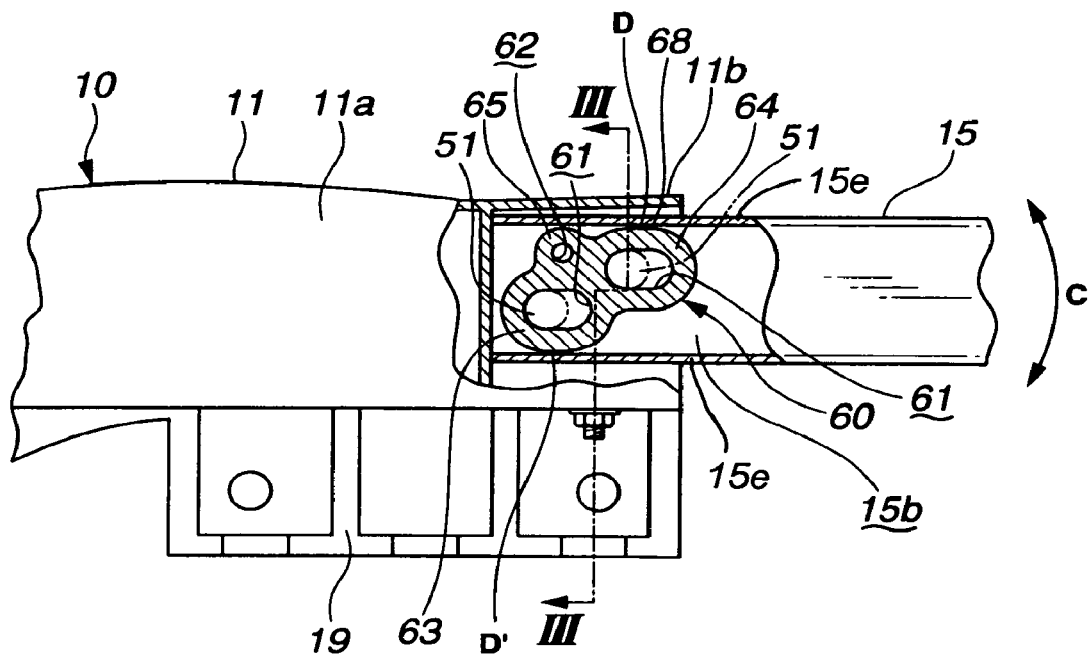
FIG. 7A is a cross-sectional view showing the connecting structure for a hollow member or a half hollow member in the first embodiment.
Figure 7B:
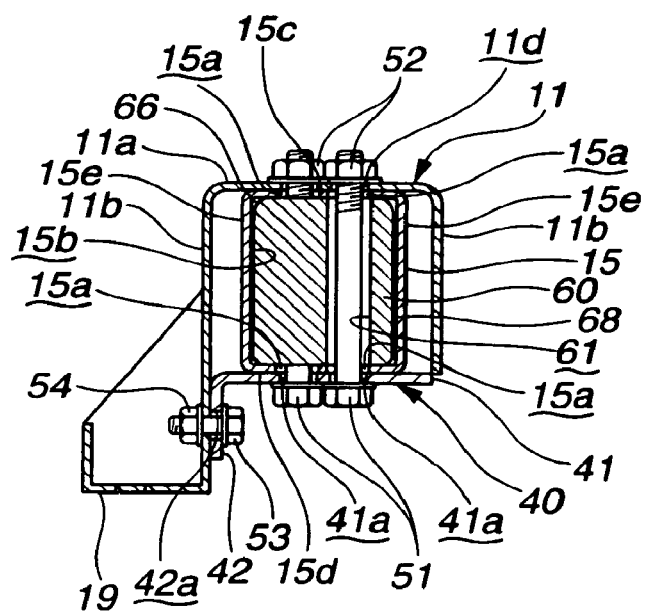
FIG. 7B is a cross-sectional view taken along a section line III-III of FIG. 7A.
Figure 8:
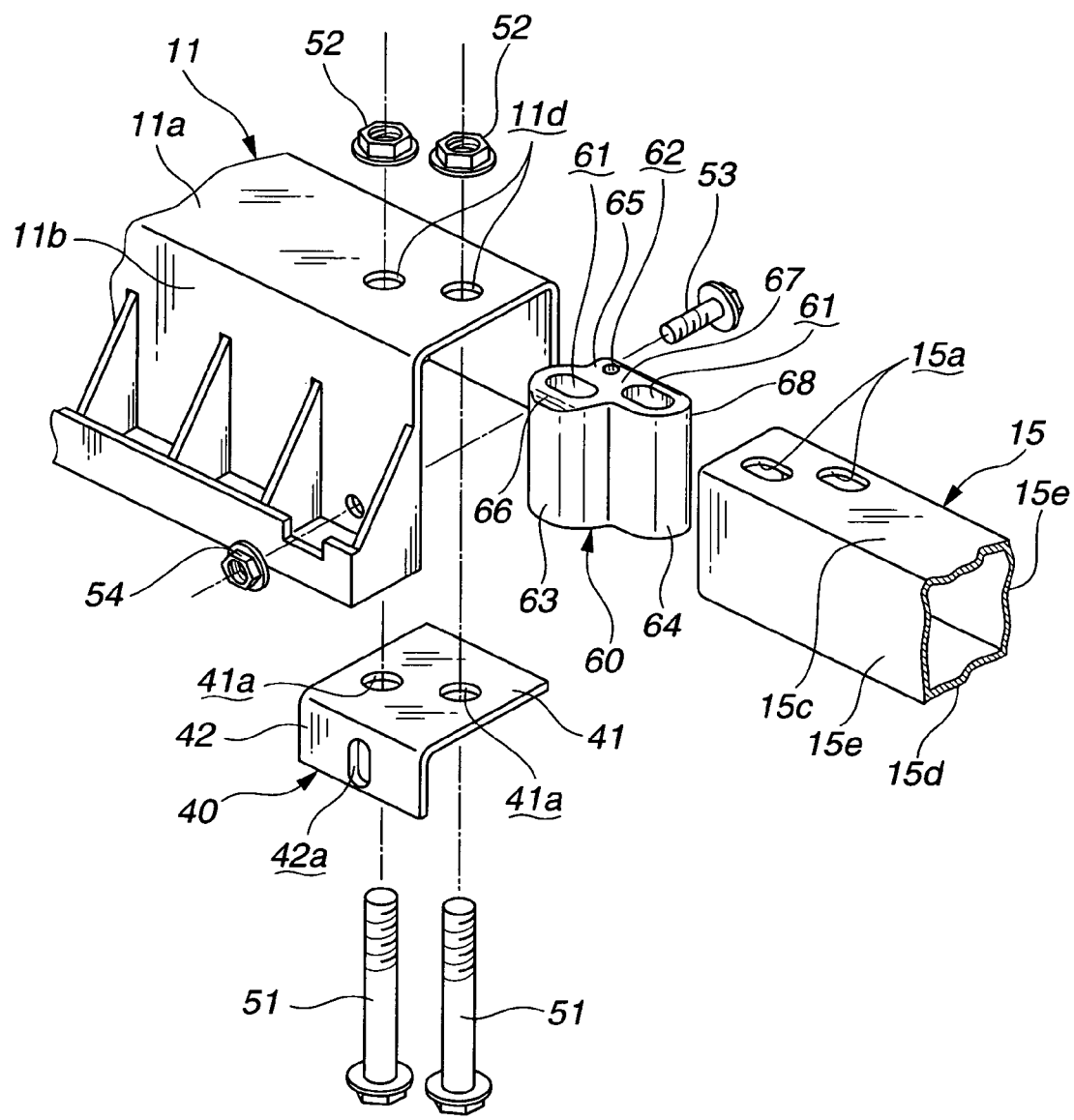
FIG. 8 is an exploded perspective view showing an auxiliary side-member, a collar, bolts, and nuts in the first embodiment.

At first, a first embodiment according to the present invention will now be explained. FIG. 1 is a plan view showing a suspension member of an automotive vehicle, to which a connecting (coupling) structure for a hollow member or the like is applied according to the first embodiment. FIG. 2 is a side view of the suspension member shown in FIG. 1. FIG. 3 is a bottom view of the suspension member shown in FIG. 1. FIG. 4 is a bottom and oblique perspective view showing a supporting portion for a lower arm of a suspension arm and showing a coupling portion between a vehicle body (main frame) and a rear end portion of a side member, in this embodiment. FIG. 5 is an enlarged side view of FIG. 4. FIG. 7A is a partially cross-sectional view showing an enlarged part of FIG. 1. FIG. 7B is a cross-sectional view taken along a section line III-III of FIG. 7A. In this embodiment, a structural member having a rectangular and closed cross-section is employed as one example of the hollow member or the like.

The suspension member 1 mainly includes a suspension-member main body 10, an auxiliary (subsidiary) side-member 15 serving as the hollow member, and a first cross member 14, as shown in FIGS. 1 to 3. A side member 11 is provided in suspension member 1 so as to extend in a front-rear (i.e., longitudinal) direction of the vehicle (body). Suspension-member main body 10 includes a pair of side members 11, a center cross member 12 connecting intermediate (middle) portions of both side members 11 with each other, and a rear cross member 13 connecting rear-end portions of both side members 11 with each other. Moreover, suspension-member main body 10 is formed by integrally forming a pair of side members 11, center cross member 12, and rear cross member 13. In detail, suspension-member main body 10 is molded by a casting from aluminium alloy, so as to form a pair of side members 11, center cross member 12, and rear cross member 13 in one piece. Auxiliary side-member 15 is connected with an end portion of each of both side members 11 at the front side of side member 11, and extends in the front-rear direction of the vehicle. Moreover, auxiliary side-member 15 is formed by an extrusion of aluminium alloy (i.e., is formed from an extruded shape made of aluminium alloy). First cross member 14 is attached so as to hang first cross member 14 across end portions of both auxiliary side-members 15. Namely, first cross member 14 is connected with both auxiliary side-members 15 at both end portions of first cross member 14. In suspension-member main body 10, each combining (connecting) portion of two members among both side members 11, center cross member 12, and rear cross member 13 is formed in arc shape to avoid a stress concentration.

Auxiliary side-member 15 is formed as a different member from suspension-member main body 10, for the following reasons. First, the part having a simple shape can be easily manufactured by the extrusion molding, as a different member from the main-body part having a complex shape which is formed by the casting molding. Next, when a minor (slight) collision occurs, auxiliary side-member 15 can constantly absorb an energy caused by the collision within a certain definite range in corporation with the vehicle body (i.e., a side frame). Thereby, it can be prevented that the minor collision affects suspension-member main body 10 and a drive unit, a steering unit, a brake unit, and the like respectively mounted on suspension-member main body 10.

Each side member 11 includes a connecting portion 16 for connecting side member 11 to side frame 2 of the vehicle body, at the rear end portion of side member 11 with respect to the front-rear direction of vehicle body. Also, side member 11 includes a connecting portion 17 for connecting side member 11 to side frame 2, at the portion shifted a little in the front-side direction from the center of side member 11. Hereinafter, connecting portion 16 and connecting portion 17 are respectively called a rear-end connecting portion (or a vehicle-interior side connecting portion) 16 and an intermediate connecting portion 17. A supporting portion 21 (also called, a first supporting portion 21) and a rupture inducing portion 20 are provided near rear-end connecting portion 16. At first supporting portion 21, suspension-member main body 10 supports a rear-end-side arm segment (or section) 3a of a lower arm 3. This lower arm 3 constitutes a suspension arm in an area located more in the front-side direction than rear-end connecting portion 16. Rupture inducing portion 20 is provided so as to allow suspension-member main body 10 to rupture or break at its part between rear-end connecting portion 16 and first supporting portion 21 when receiving an impactive force from front in the case of collision of the vehicle. This rupture inducing portion 20 is formed e.g. by providing a step(s) (difference in width) to a suspension-member main body 10's part corresponding to rupture inducing portion 20. Accordingly, when the stress exceeds a constant level, the stress concentration is caused at rupture inducing portion 20 and thereby suspension-member main body 10 is ruptured. Side member 11 includes a supporting portion 22 (also called, a second supporting portion 22) at the intermediate portion of side member 11. At second supporting portion 22, suspension-member main body 10 supports a front-end-side arm segment 3b of lower arm 3.

Side member 11 includes an upper-surface portion 11a, side walls 11b each extending downwardly from a side edge of upper-surface portion 11a, and a stiffening rib(s) 30. Two side walls 11b extend perpendicularly from both side edges of upper-surface portion 11a, so that the cross section of side member 11 is substantially shaped like an inverted U as viewed from the front direction of vehicle. Stiffening rib 30 is provided so as to protrude from a reverse surface of upper-surface portion 11a, in an area at least including the area of rupture inducing portion 20. Namely, stiffening ribs 30 are formed in a protruding manner, so as to expand in the front-rear direction and along side member 11. As shown in FIG. 3, rear-end connecting portion 16 includes a boss 16b having (i.e., formed with) a connecting hole 16a. Intermediate connecting portion 17 includes a boss 17b having a connecting hole 17a. The strength of these bosses 16b and 17b is enhanced by continuously providing stiffening ribs 30 also on respective bosses 16b and 17b. Thereby, the strength of suspension member 1 which is needed during a normal running of the vehicle can be secured. Moreover as shown in FIG. 3, first supporting portion 21 includes two bosses 21b each having a mounting hole 21a. The strength of these bosses 21b is also enhanced by continuously providing stiffening ribs 30 to respective two bosses 21b. It is noted that side wall 11b is also a stiffening rib for stiffening (reinforcing) side member 11.

Second supporting portion 22 includes a front-side bracket 22a and a rear-side bracket 22b. These front-side bracket 22a and rear-side bracket 22b face to (are confronted with) each other in the front-rear direction of the vehicle. At a front side from front-side bracket 22a (i.e., in an area subsequent to front-side bracket 22a in the front direction of vehicle), a stiffening rib 23a is provided (continuously formed) as shown in FIGS. 2 and 3. In the similar manner, at a rear side from rear-side bracket 22b (i.e., in an area subsequent to rear-side bracket 22b in the rear direction of vehicle), a stiffening rib 23b is provided. In this example, respective front-side bracket 22a and rear-side bracket 22b are provided to continue into side wall 11b of side member 11. Side wall 11b's portion located between front-side bracket 22a and rear-side bracket 22b is cut so that the height of this portion of side wall 11b is gradually lowered toward front from rear (i.e., toward front-side bracket 22a). The height (of protrusion) of stiffening rib 23a continuing into (i.e., joined to) front-side bracket 22a is designed to be lower than that of stiffening rib 23b continuing into rear-side bracket 22b. By so designing, front-side bracket 22a has a flexibility at some degree, while rear-side bracket 22b has a solidity. Namely when attaching front-end-side arm segment 3b of lower arm 3 to second supporting portion 22, front-end-side arm segment 3b provided with a bush is inserted between front-side bracket 22a and rear-side bracket 22b. Then, a nut 25 is screwed on a bolt 24 penetrating front-side bracket 22a, front-end-side arm segment 3b, and rear-side bracket 22b. At this time, front-end-side arm segment 3b can be solidly fixed or connected with second supporting portion 22 since front-side bracket 22a is bent moderately. Rear-side bracket 22b has an adequate stiffness against a force transmitted from lower arm 3 or the front of vehicle.

As shown in FIG. 2, each side member 11 is formed substantially in a crank shape, namely is formed so as to make a rear-side portion (or vehicle-interior-side portion) of side member 11 lower than a front-side portion of side member 11 in the vertical (upper-lower) direction of the vehicle. In other words, the side member 11's portion located to the rear direction of vehicle is lower in vertical position than the side member 11's portion located to the front direction of vehicle. In the rear-side portion of side member 11, rear-end connecting portion 16 and rupture inducing portion 20 are provided. In this example, side member 11 includes a crank-shaped step portion 11c formed to have a curved surface (i.e., bent in like arc shape). Moreover as shown in plane diagrams of FIGS. 1 and 3, step portions 11c of both side members 11 are provided or formed to incline so as to cause the rear portions of both side members 11 to gradually approach each other, from the side member 11's portion for combining side member 11 with center cross member 12 toward the side member 11's portion for combining side member 11 with rear cross member 13. Namely, both side members 11 are formed so as to bend inwardly in a lateral direction of vehicle, between the portion at which side member 11 is combined with center cross member 12 and the portion at which side member 11 is combined with rear cross member 13. Rear-end connecting portion 16 is provided or formed so as to bulge from a rear end of step portion 11c, in a direction that makes both side members 11 away from each other. Namely, rear-end connecting portion 16 is formed in a protruding manner, outwardly in the lateral direction of vehicle. By means of a fixing member (not shown) such as a nut and a bolt penetrating connecting hole 16a of this rear-end connecting portion 16, suspension member 1 is connected with side frame 2. Mounting hole 21a of first supporting portion 21 is provided at a position near and anterior to (i.e., front position than) rear-end connecting portion 16.

Rupture inducing portion(s) 20 is formed in stiffening rib 30 and side wall 11b between rear-end connecting portion 16 and first supporting portion 21. In this example, rupture inducing portion 20 is formed by means of a step portion provided at a tip portion of stiffening rib 30 (or side wall 11b). Namely, stiffening rib 30 formed all the way between crank portion 11c of side member 11 and rear-end connecting portion 16 has rupture inducing portion 20 at the tip portion thereof. As shown in FIG. 4, two stiffening ribs 30 are provided from rear-end connecting portion 16 of side member 11 to two mounting holes 21a. In other words, two stiffening ribs 30 are formed in an inverse-tapered shape, from the rear-end portion of side member 11 toward the front of side member 11. At the tip portion of each stiffening rib 30, step portion 20A is provided as rupture inducing portion 20.

As shown in FIG. 4, step portion 20A provided at the tip portion of side wall 11b formed from crank portion 11c of side member 11 to rear-end connecting portion 16 also constitutes rupture inducing portion 20.

Figure 6A:
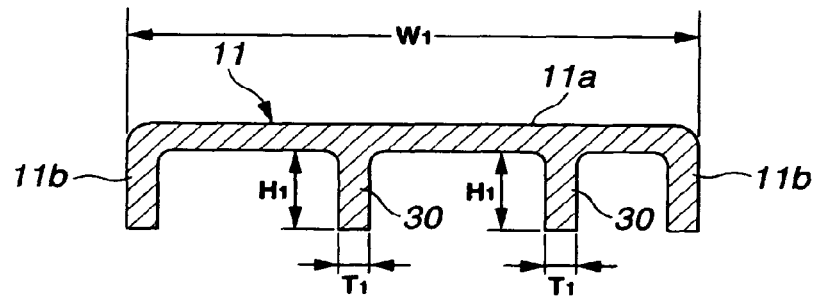
FIG. 6A is a schematic cross-sectional view taken along a section line I-I of FIG. 5.
Figure 6B:
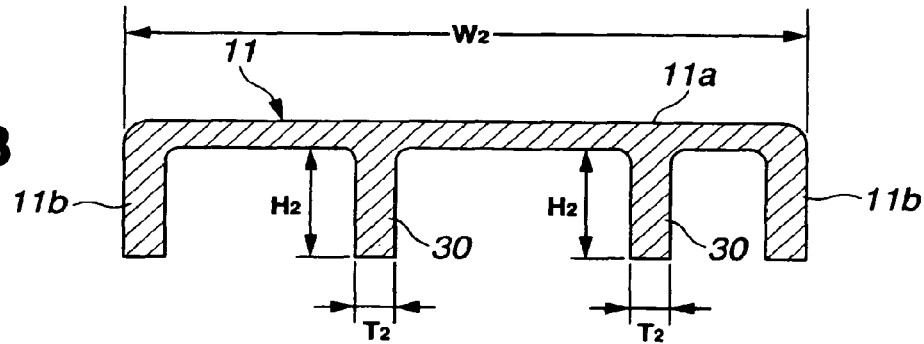
FIG. 6B is a schematic cross-sectional view taken along a section line II-II of FIG. 5.
Figure 11A:
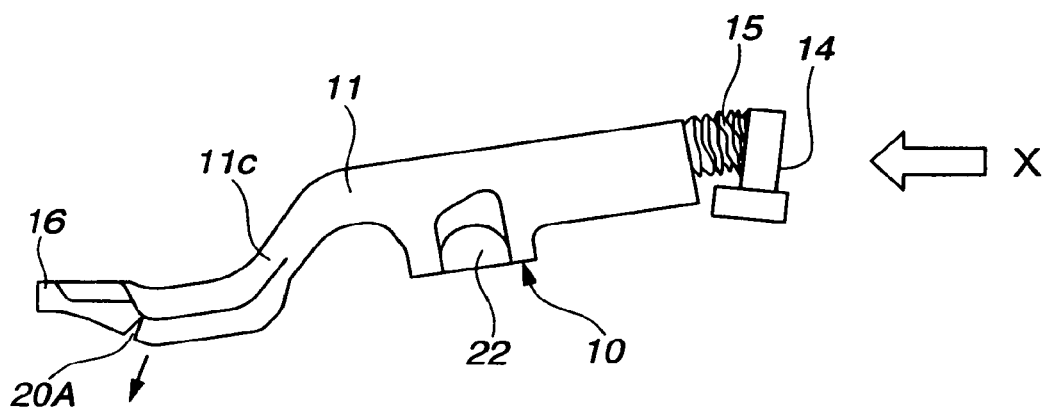
FIG. 11A is a schematic side view showing a state observed before the suspension member is ruptured due to the impact.
Figure 11B:
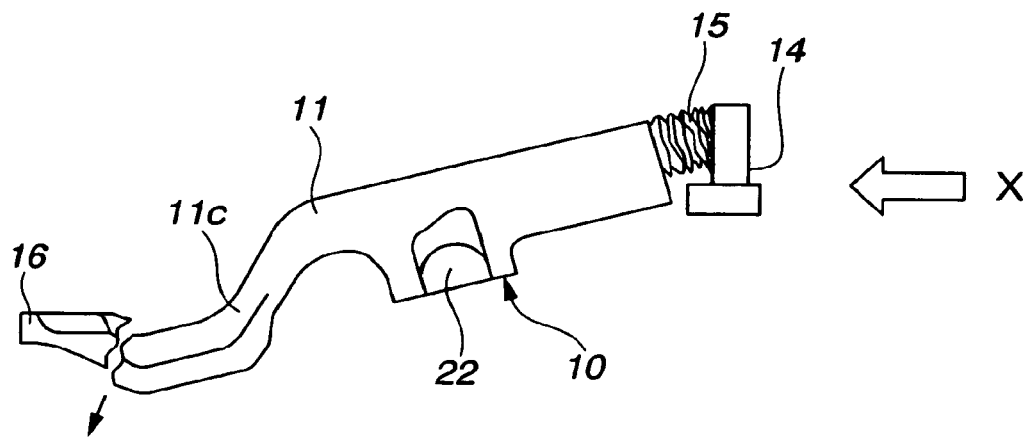
FIG. 11B is a schematic side view showing a state observed after the suspension member was ruptured due to the impact.

Hence as shown in FIGS. 11A and 11B, when suspension-member main body 10 receives an impactive force from front in the case of collision of the vehicle, the stress concentration occurs at rupture inducing portion 20 namely step portion 20A. In the case where the impactive force exceeds a tolerance limit; a crack is caused at step portion 20A, and then rupture inducing portion 20 is ruptured. In this example, the cross section of rupture inducing portion 20 of side member 11 and the cross section of side member 11 located anterior to inducing portion 20 can be schematically illustrated as shown in FIGS. 6A and 6B. It is noted that FIGS. 6A and 6B are illustrated schematically by flattening the surface portion of side member 11. A height H1 of stiffening rib 30 or side wall 11b posterior to (i.e., in rear-directional area from) rupture inducing portion 20, a board thickness T1 of stiffening rib 30 posterior to rupture inducing portion 20, a height H2 of stiffening rib 30 anterior to rupture inducing portion 20, and a board thickness T2 of stiffening rib 30 anterior to rupture inducing portion 20 satisfy the relations H1<H2 and T1<T2. Since the height and thickness of stiffening rib 30 are changed at rupture inducing portion 20; the concentration of stress is easy to occur, and thereby suspension-member main body 10 is assuredly ruptured at rupture inducing portion 20.

Although the both of the height and board thickness of stiffening rib 30 are changed between the area located anterior to rupture inducing portion 20 and the area located posterior to rupture inducing portion 20 in this example, one of the height and the board thickness may be changed to obtain the similar effect. Moreover although the height of stiffening rib 30 is designed to satisfy the relation H1<H2 in this example, stiffening rib 30 may be constructed so as to satisfy the relation H1>H2. Also in this case, rupture inducing portion 20 can function since the stress concentration is caused at the changing portion of height in stiffening rib 30. Furthermore, stiffening rib 30 may be constructed so as to satisfy the relation T1>T2 with regard to the thickness of stiffening rib 30. Whatever the case may be, it is only necessary to induce the rupture at rupture inducing portion 20 by changing the thickness and/or board height of stiffening rib 30 and thereby causing the stress concentration.

The rupture inducing portion(s) 20 may be formed at stiffening rib 30, at side wall 11b capable of meaning a stiffening rib, or at both stiffening rib 30 and side wall 11b.

In this example, a width W1 of rupture inducing portion 20 (i.e., width of cross section of side member 11 at the position of rupture inducing portion 20) and a width W2 of cross section of side member 11 anterior to rupture inducing portion 20 satisfy the relation W1<W2, as shown in FIGS. 6A and 6B. Hence, the rupture is certainly caused at rupture inducing portion 20; since a cross-sectional area of rupture inducing portion 20 is smaller than a cross-sectional area located anterior to rupture inducing portion 20, in side member 11.

Center cross member 12 is formed with mounting holes 12a for fixing an engine 4, at both of left and right sides of center cross member 12. The rear end portion of engine 4 is fixed or connected to center cross member 12 through a fixing member (not shown) such as bolts penetrating these mounting holes 12a. The front side of engine 4 is fixed with side frame 2.

On a laterally-inner surface of front end side of side member 11, bracket 19 for mounting a stabilizer 6 is provided in a protruding manner. Namely, on the mutually-opposed surfaces (side walls) of both side members 11 located at the front-end sides of both side members 11, brackets 19 are attached so as to protrude in the inward direction of suspension-member main body 10. Moreover, one end portion of a center bar 8 is connected with (or, mounted on) rear cross member 13, and another end portion of center bar 8 is connected with center cross member 12 via a stiffened plate 7. By using this center bar 8, a steering component(s) (not shown) is mounted on suspension member 1.

Auxiliary side-member 15 (hollow member of this embodiment) is formed by way of the extrusion of aluminium alloy, substantially in a shape of hollow rectangular in cross section. Namely, auxiliary side-member 15 is a hollow member including, for example, an upper edge (or upper-side portion) 15c, an lower edge (or lower-side portion) 15d placed apart from upper edge 15c, and a pair of linking edges (or left-side and right-side portions) 15e linking these two edges 15c and 15d, in cross section of the hollow member. Namely, these upper edge 15c, lower edge 15d, and two linking edges 15e as viewed in cross section of the hollow member correspond respectively to an upper-side wall (or face) of hollow member, a lower-side wall of hollow member, and left-side and right-side walls of hollow member. In other words, auxiliary side-member 15 is substantially in the form of a rectangular tube defined by upper-side portion 15c, lower-side portion 15d, and two linking portions 15e. Two auxiliary side-members 15 are fixedly connected with the front-end portions of both side members 11 of suspension-member main body 10. Namely as shown in FIGS. 7A and 7B, each auxiliary side-member 15 is connected with suspension-member main body 10 which is formed as a different member from auxiliary side-member 15, by using (surfaces of) the mutually-opposed two edges 15c and 15d, a bolt(s) 51, and a nut(s) 52. Both end portions of first cross member 14 are respectively connected with front-end portions of both auxiliary side-members 15. Additionally, each auxiliary side-member 15 includes a front-end connecting portion 18 for the connection with side frame 2 of vehicle body, at the front-end portion of auxiliary side-member 15.

Under the condition where an after-mentioned collar 60 temporarily attached inside a hollow portion 15b of rear-connecting side of auxiliary side-member 15 is interposed, auxiliary side-member 15 is connected with the front-end portion of side member 11 of suspension-member main body 10; by screwing side member 11, upper edge 15c and lower edge 15d of auxiliary side-member 15, and an attachment bracket 40 formed at a substantially right angle, by means of bolt(s) 51, nut(s) 52, and attachment bracket 40. Each of upper edge 15c of auxiliary side-member 15 and lower edge 15d of auxiliary side-member 15 has a plurality of bolt (inserting) holes 15a each formed in an elliptical or oblong shape, for example two bolt holes 15a. One of these two bolt holes 15a is placed at a position which is shifted from a position of (the center of) another bolt hole 15a in a longitudinal direction of auxiliary side-member 15 and also in a width direction perpendicular to the longitudinal direction.

Since the two bolts 51 fix auxiliary side-member 15 as mentioned above, auxiliary side-member 15 does not rotate around (about) a bolt portion with respect to side member 11 (ref. in a direction of arrow C of FIG. 7A). Moreover, the two bolts 51 can fix and connect auxiliary side-member 15 to side member 11 steadily and solidly.

Since the center positions of bolt holes 15a are located at positions each of which is displaced in the longitudinal direction of auxiliary side-member 15 and also displaced in the width direction perpendicular to the longitudinal direction from the center position of the other bolt hole 15a, bolts 51 are disposed diagonally relative to auxiliary side-member 15. Accordingly, a plurality of bolts 51 and a plurality of nuts 52 do not interfere with each other, and moreover the solid connection can be achieved; even if a space for arranging bolts and nuts is relatively confined or narrow.

First cross member 14 is connected or coupled between front-end portions of both auxiliary side-members 15. At the front-end portion of auxiliary side-member 15, front-end connecting portion 18 is provided for connecting auxiliary side-member 15 to side frame 2 of vehicle body.

In this example, collar 60 is formed, by cutting an extruded material of aluminium alloy in accordance with a dimension (or length) between two edges 15c and 15d of hollow portion 15b of auxiliary side-member 15. Furthermore, collar 60 is formed so as to be a block including a contact surface 67 having a chamfer (chamfered portion) 66, at the end of collar 60. Chamfer 66 is provided to avoid causing collar 60 to interfere with an arc-shaped corner portion of inner surface of auxiliary side-member 15. Namely, collar 60 is formed so as to fit to the dimension between two edges (i.e., two side portions of auxiliary side-member) 15c and 15d and so as to include both contact surfaces 67 each formed with chamfer(s) 66 provided in the end portion(s) of contact surface 67.

This chamfer 66 is provided if need arises. Namely, chamfer 66 may be unnecessary in dependence upon the shape of corner portion of the inner surface of auxiliary side-member 15 or a dimension of collar 60.

As shown in FIGS. 7A-9A, collar 60 is designed like a shape formed by shifting two elliptical-shape portions 63 and 64 from each other and then combining these two elliptical-shape portions 63 and 64 in horizontal cross section. Collar 60 includes two elliptical-shape portions 63 and 64, and a bulging portion 65. Bulging portion 65 protrudes approximately in an arc shape of horizontal cross section, outwardly from the combining portion between elliptical-shape portions 63 and 64. In each of elliptical-shape portions 63 and 64, a bolt (inserting) hole 61 is provided in an elliptical or oblong shape in horizontal cross section. Namely, each of elliptical-shape portions 63 and 64 is formed with bolt hole 61 vertically penetrating the corresponding elliptical-shape portion. In bulging portion 65, a through hole 62 is provided to extend vertically along bolt hole 61. Namely, bulging portion 65 is formed with through hole 62 penetrating bulging portion 65 substantially parallel to bolt hole 61 passing through both contact surfaces 67. Moreover, collar 60 includes a rotation preventing portion 68 for being in contact with (the inner surface of) linking edge(s) 15e of auxiliary side-member 15, outside elliptical-shape portions 63 and 64.

Figure 9A:
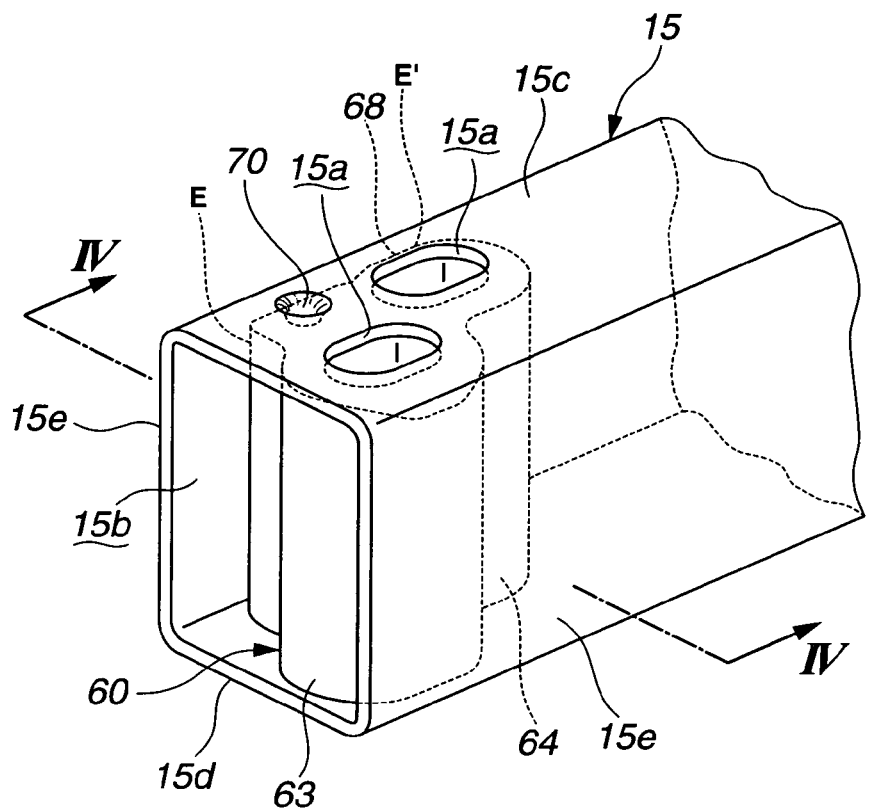
FIG. 9A is an oblique perspective view showing a temporary attachment of the collar in the first embodiment.
Figure 9B:
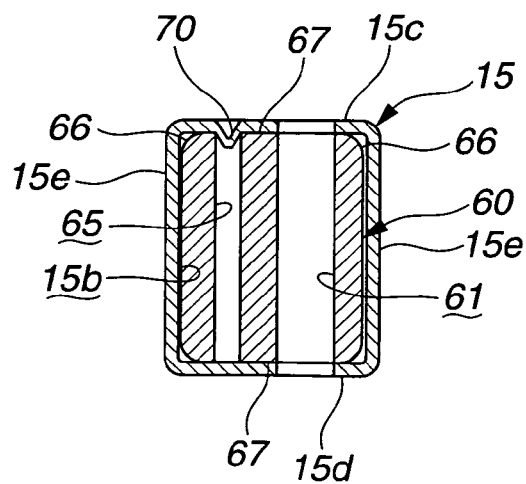
FIG. 9B is a cross-sectional view taken along a section line IV-IV of FIG. 9A.

Collar 60 formed as described above is inserted inside hollow portion 15b, in a direction that fits two bolt holes 61 to two bolt holes 15a each of which is provided in two edges 15c and 15d at an end portion of rear-connecting side of auxiliary side-member 15. Then as shown in FIGS. 9A and 9B, one of two edges 15c and 15d of auxiliary side-member 15 is deformed into the through hole 62 at an edge 15c's (or 15d's) position corresponding to the position of through hole 62, by using a tool such as a punch. By so-doing, namely by deforming auxiliary side-member 15 to sink into through hole 62; a caulk (caulked portion or staking portion) 70 is formed in one of two edges 15c and 15d, and thereby collar 60 is caulked and temporarily attached to auxiliary side-member 15. Rotation preventing portion 68 prevents this temporarily joined collar 60 from rotating about the caulked portion inside hollow portion 15b, since rotation preventing portion 68 is in contact with linking edge 15e. Therefore, the position of bolt hole 61 does not deviate from the position of bolt (continuous-) hole 15a. In such a case, rotation preventing portion 68 is in contact with one of both linking edges 15e by means of surface contact, at a spot E-E' located ahead and behind the caulked portion, as shown in FIG. 9A. May be in such a case, rotation preventing portion 68 is in contact with both linking edges 15e at two points D and D' of linking edges 15e and 15e, as shown in FIG. 7A. In any case, collar 60 does not rotate around the caulked portion, and thereby the position deviation between bolt hole 61 and bolt hole 15a can be credibly avoided.

Regarding the above-mentioned surface contact or two-point contact, it is not necessary that rotation preventing portion 68 is in contact with linking edge(s) 15e at all times. Namely, it is only necessary that rotation preventing portion 68 makes a contact with linking edge(s) 15e so as not to allow collar 60 to rotate beyond a constant range, i.e., tolerance. Even if collar 60 rotates around the caulked portion in some degree, the position deviation between bolt hole 61 and bolt hole 15a does not affect the fastening of bolt 51 and nut 52 in the case where this rotation area is small. Hence, rotation preventing portion 68 has only to become in contact with linking edge(s) 15e before the position deviation between bolt hole 61 and bolt hole 15a starts to affect the fastening of bolt 51 and nut 52.

Thereby, auxiliary side-member 15 can be equipped with collar 60 in advance. Accordingly, it is unnecessary to insert collar 60 into auxiliary side-member 15 and adjust these positions at the time of connecting operation for auxiliary side-member 15 and side member 11. Moreover, the risk of a loss of collar 60 can be remarkably reduced. Furthermore, a forgetting about the installation of collar 60 can be checked by determining whether the caulked portion is present as viewed from the outside.

The operating procedure for mounting this auxiliary side-member 15 to suspension-member main body 10 is as follows. At first, the end portion of auxiliary side-member 15 in which collar 60 was temporarily joined in advance is inserted within the side member 11's front-end portion shaped like inverted-U in vertical cross section. Next, an attachment segment (section) 41 of attachment bracket 40 is made to abut on the lower surface of auxiliary side-member 15. Then, bolt 51 is made to pass (or penetrate) through an attachment hole 41a provided in attachment segment 41, bolt continuous hole 15a provided in auxiliary side-member 15, bolt hole 61 provided in collar 60, and a through hole 11d provided in upper-surface portion 11a of side member 11, from the lower direction of the vehicle. Under this situation, nut 52 is screwed on a projecting portion of bolt 51. At this time, auxiliary side-member 15 is prevented from being deformed due to fastening force (clamping pressure) by bolt 51 and nut 52, since both contact surfaces 67 of collar 60 respectively abut on the inner surfaces of the mutually-opposed two edges 15c and 15d of auxiliary side-member 15. Because of this fastening force, auxiliary side-member 15 is tightly supported by sandwiching auxiliary side-member 15 between upper-surface portion 11a of side member 11 and attachment segment 41. Next, a fixing bolt 53 is made to pass into bracket 19 which serves to mount stabilizer 6, through a slotted (or elliptical) hole 42a provided in a fixing segment (section) 42 of attachment bracket 40. Under this situation, a nut 54 is screwed on a projecting portion of fixing bolt 53. Thus, auxiliary side-member 15 is connected with suspension-member main body 10. It is noted that attachment bracket (or mounting hardware) 40 includes attachment segment 41 formed with attachment holes 41a and fixing segment 42 formed with slotted hole 42a, and upper-surface portion 11a is formed with the through holes 11d.

The suspension member 1 constructed as described above is fixed with side frame 2 of vehicle body by using bolts and nuts (not shown) at the points of front-end connecting portion 18, intermediate connecting portion 17, and rear-end connecting portion 16. Rear-end-side arm segment 3a and front-end-side arm segment 3b of lower arm 3 of the suspension arm are respectively supported at the points of first supporting portion 21 and second supporting portion 22 of side member 11.

Figure 10:
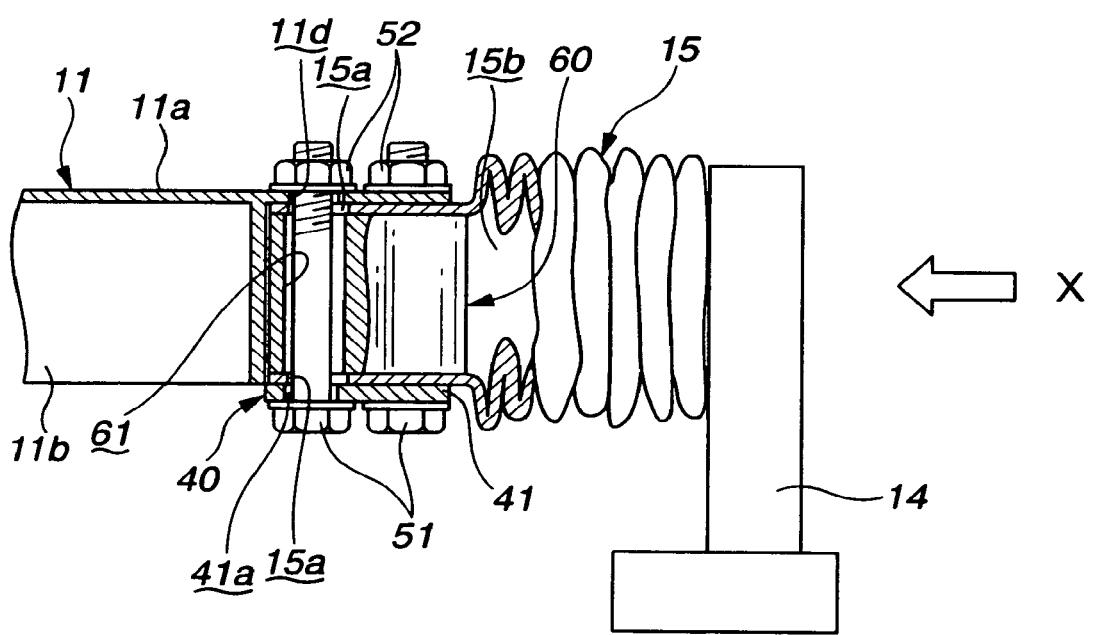
FIG. 10 is a schematic cross-sectional view showing a state where the auxiliary side-member receives an impact.

In suspension member 1 constructed as described above, each auxiliary side-member 15 is connected with suspension-member main body 10 by using collar 60. When receiving an impactive force from the front of vehicle due to the collision and the like, such as in the direction indicated by arrow X, a buckling deformation (buckling distortion) is caused to the front side of auxiliary side-member 15 except its connecting portion, as shown in FIG. 10. Namely, auxiliary side-member 15 except its connecting portion can be crushed, when for example the collision occurs. Therefore, auxiliary side-member 15 can absorb or weaken the impactive energy in corporation with side frame 2.

In suspension member 1 constructed as described above, the following phenomenon can occur when receiving an impactive force from the front of vehicle due to the collision or the like. As shown in FIGS. 11A and 11B, at first, auxiliary side-member 15 possessing lower stiffness than suspension-member main body 10 absorbs the impactive energy by means of the buckling deformation of auxiliary side-member 15. If a further impactive force is added to suspension member 1; a bending moment is produced on side member 11 so as to act downwardly around the rear-end connecting portion (vehicle-interior side connecting portion) 16 serving as a fulcrum of the bending moment, and the stress concentration arises at rupture inducing portion 20 namely at step portion 20A. As a result, when the stress exceeds a tolerance limit; a crack is caused in rupture inducing portion 20, and then rupture inducing portion 20 is ruptured.

Thereby, the impactive energy caused due to the collision is not transmitted into the vehicle interior (room) via suspension member 1. Namely, the impactive energy is transmitted into the vehicle interior via side frame 2 (vehicle body). Accordingly, the energy is smoothly absorbed by a buckling of vehicle body (i.e., a shaft crushing of side frame). At the time of above-mentioned rupture, side member 11 and lower arm 3 are moved to the lower direction, and therefore lower arm 3 can be prevented from being moved inside the vehicle interior.

Figure 12A:
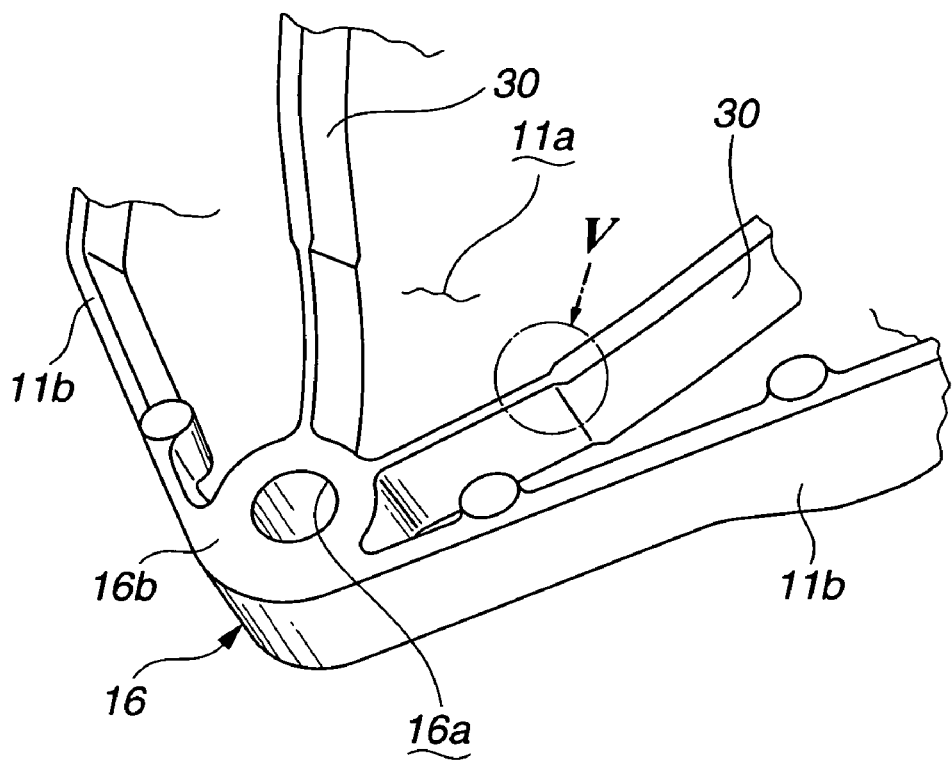
FIG. 12A is a bottom and oblique perspective view showing a second example of the rupture inducing portion in the first embodiment.
Figure 12B:
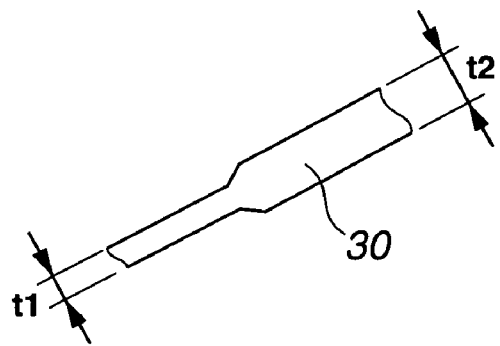
FIG. 12B is an enlarged bottom view of a region V of FIG. 12A.

In this example, the case where rupture inducing portion 20 is formed or defined by step portion(s) 20A provided at the tip portion of stiffening rib 30 or side wall 11b has been explained. However, for example instead of step portion 20A, a wall thickness t1 of stiffening rib 30 and/or side wall 11b in stiffening rib 30's (or side wall 11b's) portion corresponding to rupture inducing portion 20 may be formed to be thinner than a wall thickness t2 of stiffening rib 30 (or side wall 11b) anterior to rupture inducing portion 20, as shown in FIGS. 12A and 12B.

Additionally in such a case, wall thickness t1 of stiffening rib 30 and/or side wall 11b in stiffening rib 30's (or side wall 11b's) portion corresponding to rupture inducing portion 20 may be formed to be thicker than wall thickness t2 of stiffening rib 30 (or side wall 11b) anterior to rupture inducing portion 20.

Figure 13:
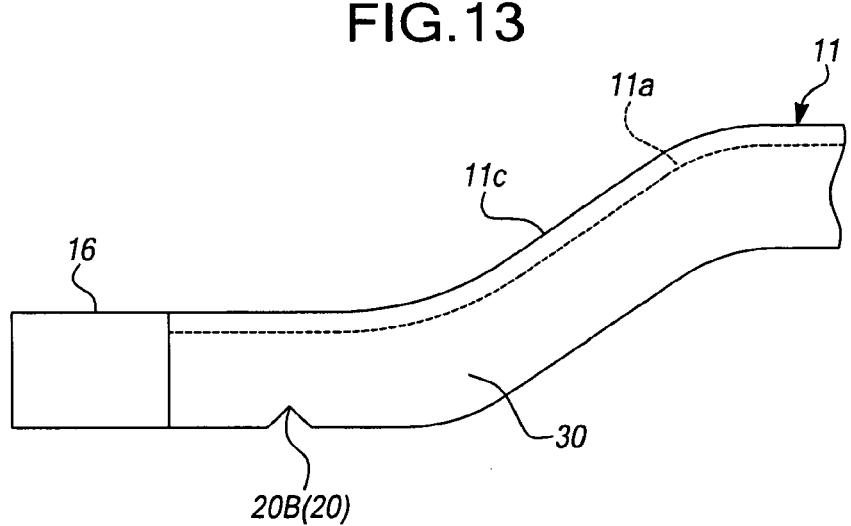
FIG. 13 is an enlarged side view of a third example of the rupture inducing portion in the first embodiment.
Figure 14:
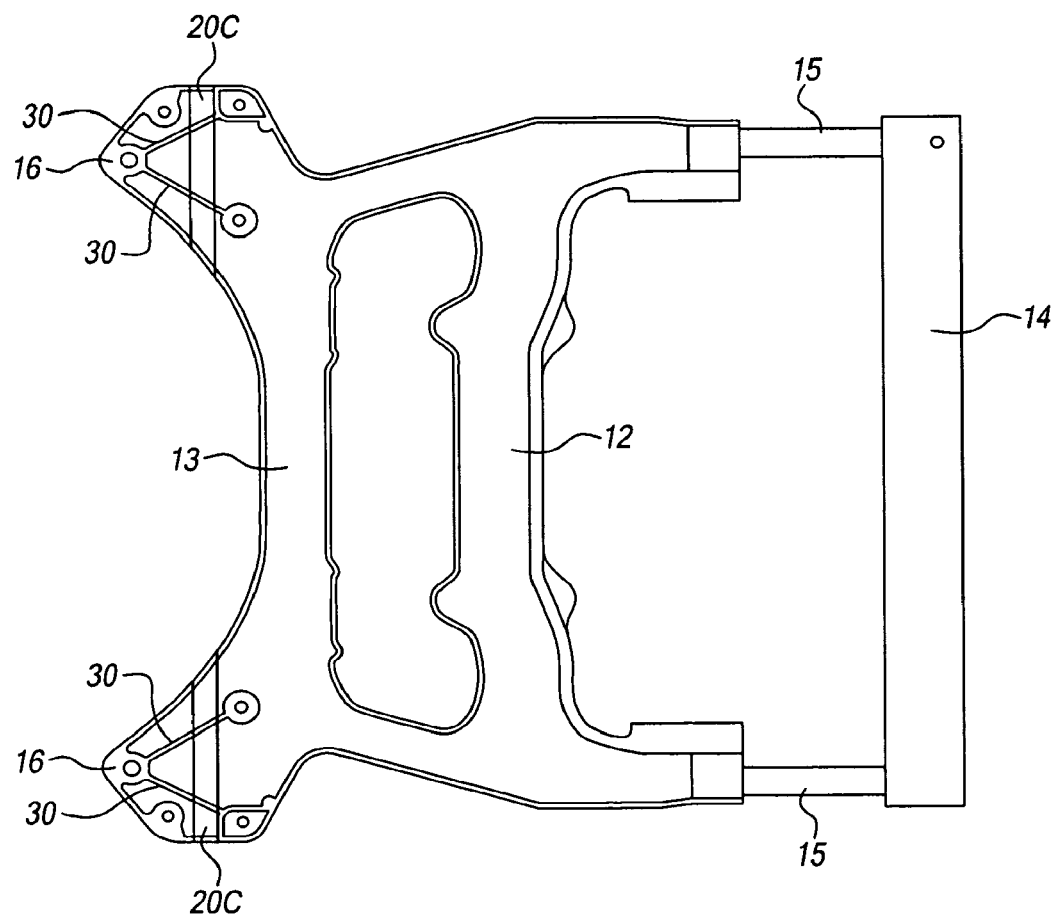
FIG. 14 is a schematic bottom view of a fourth example of the rupture inducing portion in the first embodiment.

Moreover, for example instead of step portion 20A, rupture inducing portion 20 may be defined by a notch(es) 20B provided at the tip portion of stiffening rib 30 and/or side wall 11b, as shown in FIG. 13. Furthermore, rupture inducing portion 20 may be defined by a heat-treated portion 20C which is formed by heat-treating a side member 11's portion anterior to rear-end connecting portion 16, as shown in FIG. 14. The heat-treated portion 20C is formed by softening the side member 11's portion needed to become rupture inducing portion 20 by way of heat treatment. Thereby, heat-treated portion 20C having thus-reduced strength urges the rupture when receiving an impactive force from the front. It is noted that heat-treated portion 20C may be formed only in stiffening rib 30 and/or side wall 11b of the side member 11's portion needed to become rupture inducing portion 20.

Such a heat treatment can be carried out by heating the portion needed to become rupture inducing portion 20 at a temperature higher than recrystallization temperature. For example, the heat treatment is conducted by heating this portion at 410° C. for about 20 seconds by using an arc torch, an electron beam device, a laser beam device, or the like.

The other parts shown in FIGS. 12A to 14 are same as the corresponding parts shown in the case of step portion 20A. Hence in FIGS. 12A to 14, the same parts are given same reference signs as the corresponding parts shown in the case of step portion 20A, and the explanations thereof will be omitted.

Although rupture inducing portion 20 may be defined by one of above-mentioned three modifications, namely thin wall thickness t1, notch 20B, and heat-treated portion 20C as shown in FIGS. 12A to 14; rupture inducing portion 20 may be defined by combination of two or more of the original and the three modifications, namely step portion 20A, thin wall thickness t1, notch 20B, and heat-treated portion 20C.

Figure 15:
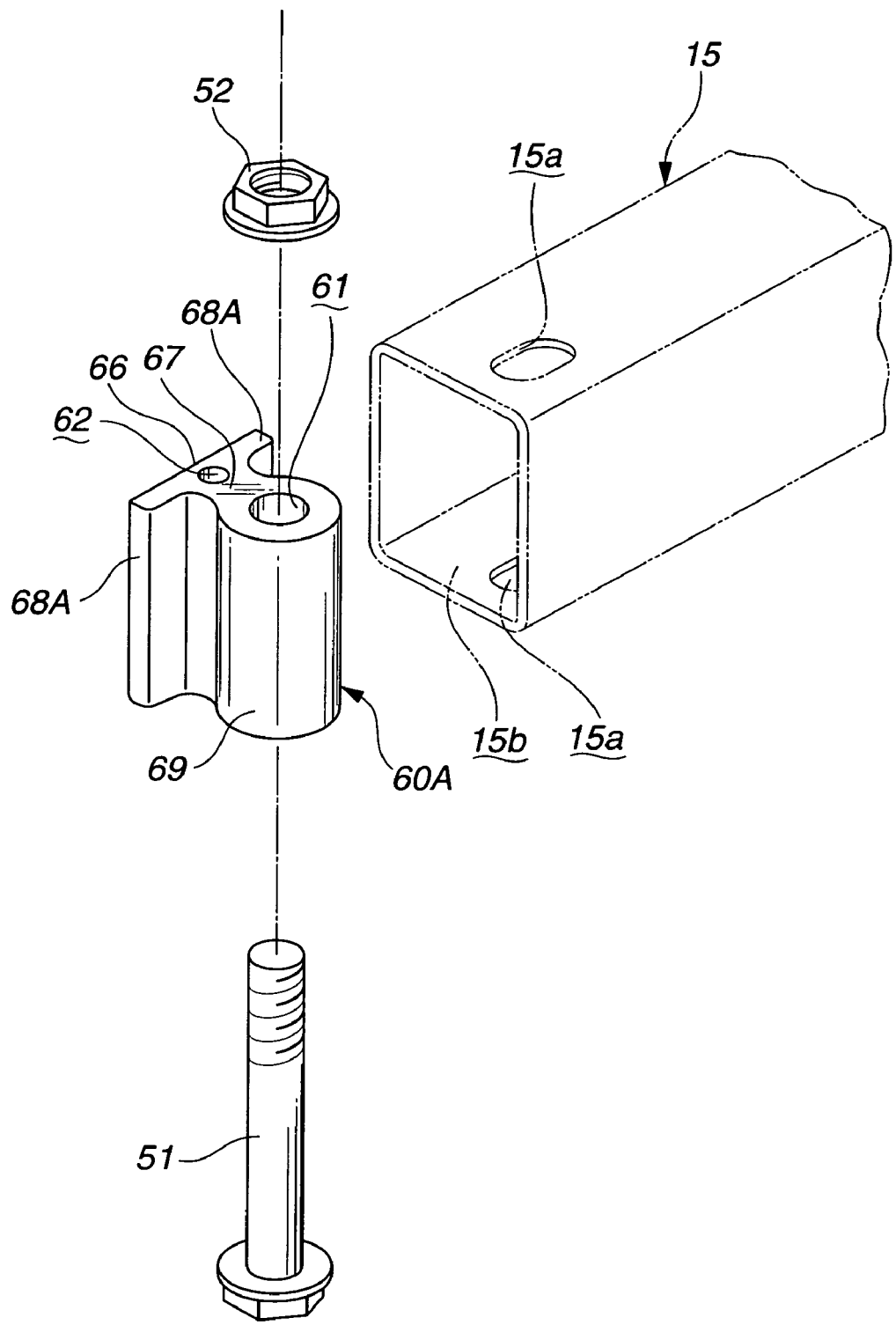
FIG. 15 is an oblique perspective view showing one modification example of the collar in the first embodiment.

In the above-described example, the case where collar 60 includes two bolt holes 61 has been explained. However, the collar may include one bolt hole 61. For example as shown in FIG. 15, a collar 60A including a base portion 69, a rotation preventing section 68A, and through hole 62 can be adopted. Base portion 69 is shaped like a circle in horizontal cross section, and is formed with one bolt hole 61. Rotation preventing section 68A is formed along a tangent of base portion 69 (i.e., in the tangential direction of base portion 69) shaped like a circular cylinder. Through hole 62 is provided along bolt hole 61 (i.e., substantially parallel to bolt hole 61), and defines a receiving portion of the caulking. Collar 60A includes contact surfaces 67 at the both end portions of collar 60A. Contact surfaces 67 can respectively abut on upper edge (upper-side portion) 15c and lower edge (lower-side portion) 15d of auxiliary side-member 15. Thus-formed collar 60A is inserted into hollow portion 15b of auxiliary side-member 15, in the same manner as collar 60. Then, collar 60A is temporarily connected with auxiliary side-member 15 by caulking one wall surface (edge 15c or 15d) of auxiliary side-member 15 at the wall surface's position corresponding to the position of through hole 62. Then, auxiliary side-member 15 can be coupled with side member 11 by using collar 60A, bolt 51, and nut 52, in the same manner as the case of collar 60.

In the above-described embodiment, the case where auxiliary side-member 15 used as a hollow member is connected with side member 11 of suspension member 1 by using attachment bracket 40 has been explained. However, the connecting structure according to the present invention is not limited to the structure in such a case.

Figure 16A:
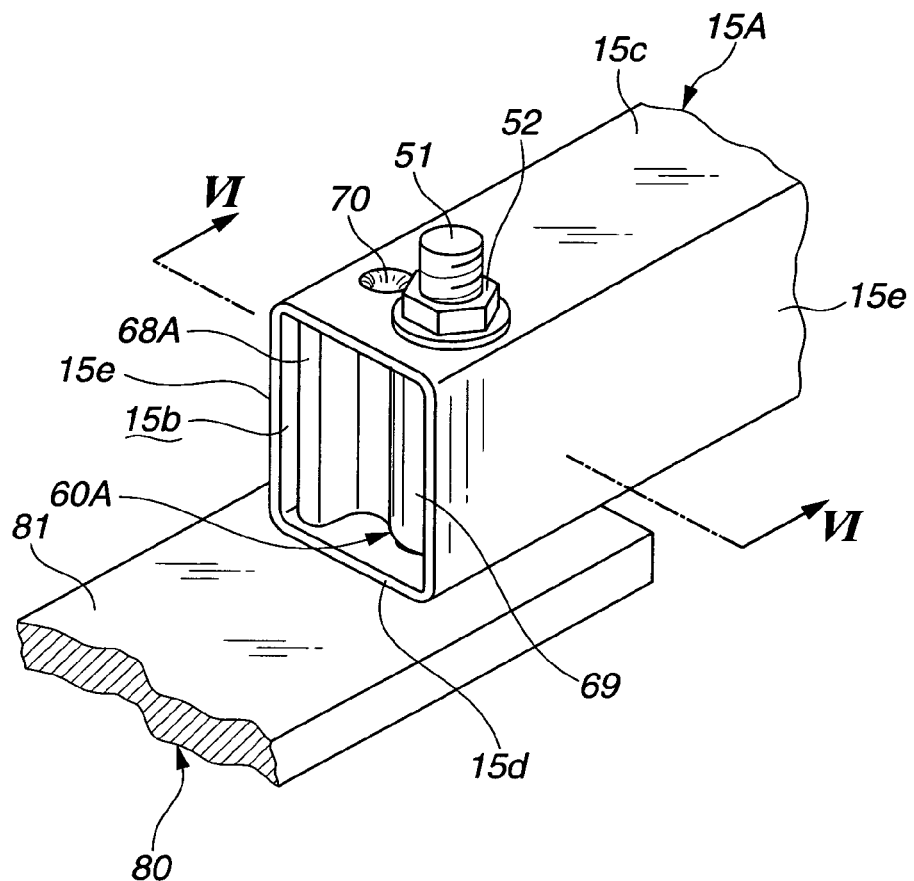
FIG. 16A is an oblique perspective view showing a second example of the connecting structure for a hollow member or a half hollow member in the first embodiment.
Figure 16B:
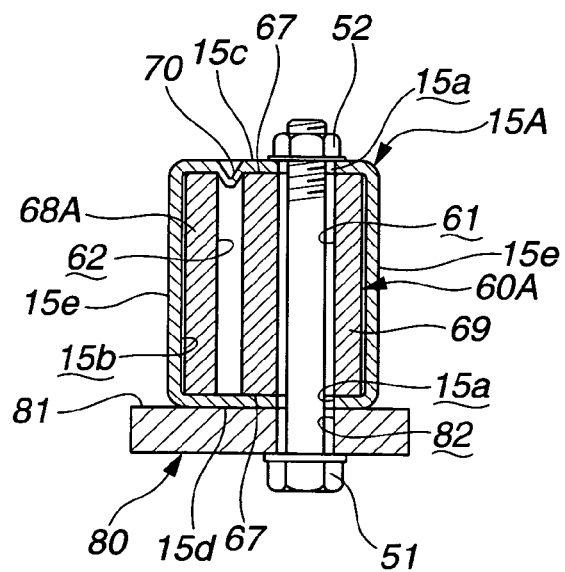
FIG. 16B is a cross-sectional view taken along a section line VI-VI of FIG. 16A.

For example as shown in FIGS. 16A and 16B, the connecting structure according to the present invention is also applicable to the following connecting structure. Namely, collar 60A is, in advance, temporarily attached in hollow portion 15b of a connecting-side end portion of a hollow member 15A which is made of aluminium alloy and which is shaped substantially like a rectangular in cross section in the similar manner as auxiliary side-member 15. Then, hollow member 15A is made to abut on an attachment surface 81 of another member 80 with which this hollow member 15A needs to be fixed. Under this situation, attachment bolt 51 is inserted through bolt continuous-hole 15a provided in hollow member 15A, bolt inserting hole 61 provided in collar 60A, and an attachment hole 82 provided in another member 80. Then, nut 52 is screwed on a projecting portion of attachment bolt 51, and thereby hollow member 15A can be connected or coupled with another member 80. Although collar 60A formed with one bolt hole 61 has been adopted in this example as shown in FIGS. 16A and 16B, hollow member 15A can be connected with another member 80 also by using collar 60 formed with two bolt holes 61 instead of collar 60A.

In this example as shown in FIGS. 16A and 16B, collar 60A does not have chamfered portion 66, and therefore collar 60A is designed to make the width of collar 60A slightly shorter than the space between both linking edges 15e of hollow member 15A so that collar 60A is not in contact with linking edges 15e.

Figure 18:
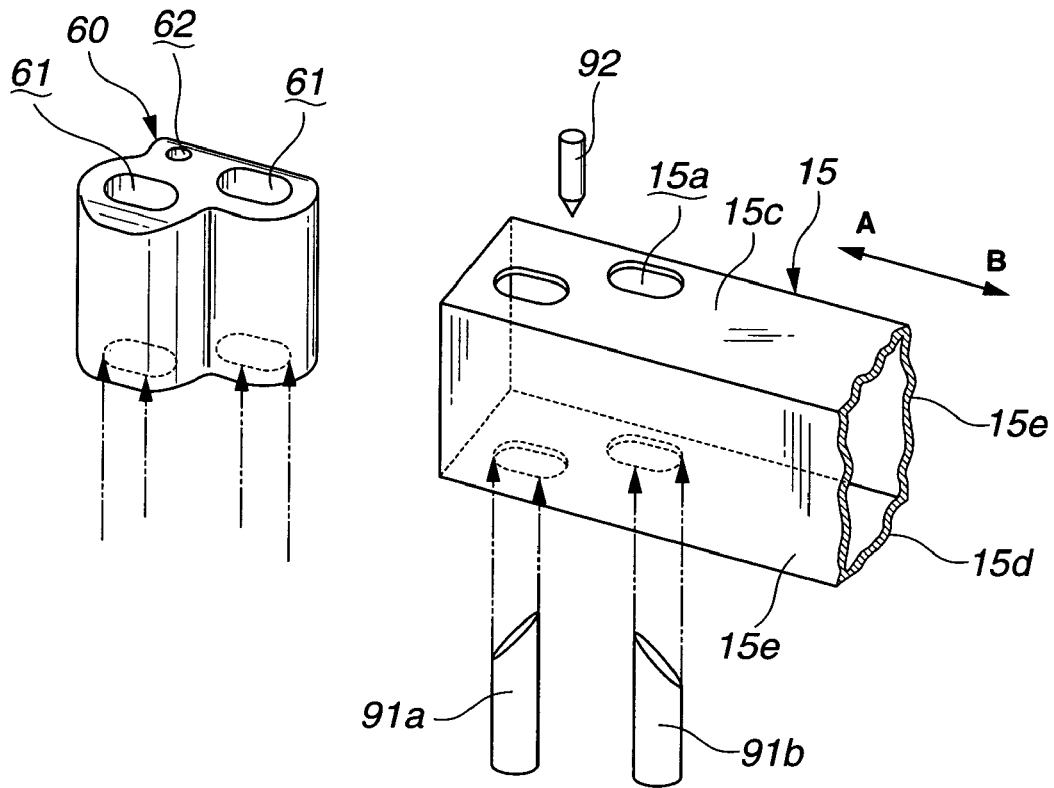
FIG. 18 is a schematic exploded perspective view showing a caulking process for the auxiliary side-member and the collar in the first embodiment.

Next, the method of caulking collar 60 with auxiliary side-member 15 will now be explained with reference to a schematic exploded perspective view of FIG. 18. In FIG. 18, reference signs 91a and 91b denote position-determining pins (locating pins). The position-determining pins are installed on a lower die (not shown) in an upstanding state. A reference sign 92 denotes a punch, and the punch is fixed downwardly and perpendicularly on a lower surface of an upper die (not shown) capable of moving up and down. The caulking working is performed by moving the punch downwardly.

A tip (portion) of position-determining pin 91a is slanted downwardly in an end direction A of auxiliary side-member 15, and a tip of position-determining pin 91b is slanted downwardly in another end direction (front-end direction of vehicle) B of auxiliary side-member 15, as shown in FIG. 18. Namely, each of the tip portions of two position-determining pins is cut in a slanting direction. Position-determining pin 91a is movable with respect to the A and B directions, and is being urged in the A direction by an elastic force of an elastic member (not shown) such as a spring. A positional relationship among punch 92 and position-determining pins 91a and 91b is determined so as to become same as the relationship among through hole 62, an A-direction end portion of slotted bolt hole 61 located more in the A direction of collar 60, and a B-direction end portion of another slotted bolt hole 61.

When conducting the caulking, collar 60 is disposed or inserted into the end portion of auxiliary side-member 15, and then auxiliary side-member 15 is moved to a position above position-determining pins 91a and 91b (in other words, position-determining pins 91a and 91b are fit into auxiliary side-member 15). Since the inclined (slanted) surface is provided at the tip portion (or upper-end portion) of each of position-determining pins 91a and 91b, auxiliary side-member 15 and collar 60 can be set on the lower die so as to conform the respective two (horizontal) positions of bolt continuous holes 15a and 15a to the corresponding positions of bolt inserting holes 61 and 61. By lowering the upper die under this situation, upper edge 15c of auxiliary side-member 15 is properly caulked toward through hole 62 by punch 92.

Figure 17:
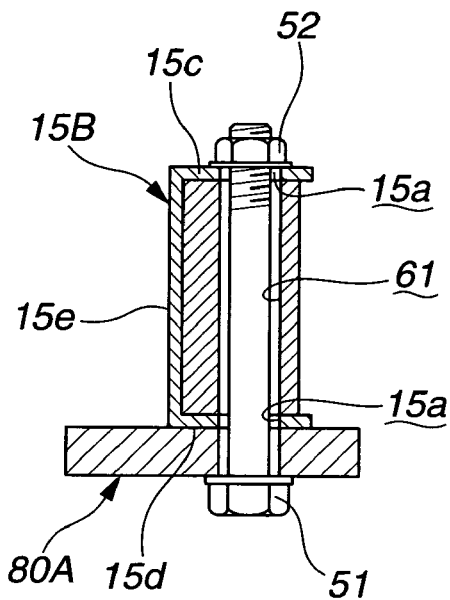
FIG. 17 is a cross-sectional view showing the connecting structure exemplified in the case where the auxiliary side-member is formed by a half hollow member in the first embodiment.

In the above-described embodiment, the case where the hollow member having a rectangular and closed cross-section has been adopted as a hollow member or the like. However, the connecting structure according to the present invention is also applicable to the case where two edges 15c and 15d of a half hollow member 15B such as a member having a substantially U-shaped and open cross-section are fixed with another member 80A to which half hollow member 15B needs to be connected, as shown in FIG. 17. Namely, half hollow member 15B is in the form of a half rectangular tube defined by upper-side portion 15c, lower-side portion 15d, and one linking portion 15e. The other parts shown in FIG. 17 are same as the corresponding parts shown in the case of hollow member 15 or 15A. Hence in FIG. 17, the same parts are given same reference signs as the corresponding parts shown in the case of hollow member 15 or 15A, and the explanations thereof will be omitted.

Moreover in the above-described embodiment, the case where the receiving portion for caulking is defined by through hole 62 has been explained. However, the receiving portion for caulking may be defined by a recess portion formed by a machine work.

Advantages and effects according to the above-described first embodiment will now be explained.

According to the first embodiment; in the connecting structure where the hollow member or the half hollow member (hereinafter simply called, hollow member) including two side portions (two walls 15c and 15d) opposed apart from each other is connected with or mounted on the other member(s) by the bolt passing through these two side portions, at least one of the collar's two contact surfaces adapted to respectively abut on the two side portions is formed with the receiving portion for caulking. When arranging the collar at a specified position between the two side portions, the caulked portion is formed from at least one of the two side portions toward this caulking-receiving portion. Thereby, the collar is temporarily joined with the hollow member. Then, the hollow member is connected with the other member by the bolt adapted to fasten the hollow member and the other member. Therefore, the hollow member can be strongly connected with the other member without deforming the hollow member due to the fastening force. Furthermore, the collar can be fixed in the hollow member beforehand. Hence, even if the hollow member is beforehand assembled with the collar in one place (of a plant) and then the hollow member is fastened to the other member by the bolt in another place (of the plant), it can be easily conducted by making a visual inspection of the caulked portion to determine whether the collar has been installed. Therefore for example, it is not caused to forget to install the collar.

According to the first embodiment; the collar includes the rotation preventing portion capable of becoming in contact with the linking portion(s) linking the two side portions of the hollow member with each other, so as to prevent the rotation of collar. Accordingly, the position deviation between the bolt-hole provided in the collar and the bolt continuous-hole formed in the two side portions, which is caused due to a free rotation of collar can be credibly avoided. Therefore, the execution of connecting work of the hollow member can be made easier. Moreover since the rotation preventing portion is designed to become in contact with the linking portion(s) by means of surface contact or two-point contact, the position deviation between the bolt-hole of collar and the bolt continuous-hole of two side portions, can be more credibly avoided.

According to the first embodiment; the collar is formed by the extrusion of aluminium alloy, and both of the caulking-receiving portion (i.e., through-hole) and the bolt-hole of collar are formed by the extrusion molding without some other particular process. Accordingly, the collar can be temporally joined within the hollow member, by disposing the collar between the two side portions of hollow member, and by deforming at least one of the two side portions of hollow member toward the caulking-receiving portion at the hollow member's part corresponding to the caulking-receiving portion by way of caulking executed by using a tool such as a punch. Therefore, the temporary joint of collar can be made easier and more reliable. Furthermore since both of the caulking-receiving portion (i.e., through-hole) and the bolt-hole of collar can be formed simultaneously at the time of extrusion forming of the collar itself, it is unnecessary to process these holes separately. Hence, the process for these holes can be made easier.

According to the first embodiment; the collar is formed with a plurality of bolt-holes. Hence, only one collar can serve even in the case where the usage of a plurality of bolts is necessary. According to the first embodiment; the bolt-hole of collar is designed to become an elongated hole. Hence, an error in installation position of the collar or an error in relative position between the collar and the bolt continuous-hole can be adjusted or compensated for. Therefore, the execution of connecting work of the hollow member can be made easier and more reliable. Furthermore according to the first embodiment; at least two of the plurality of elongated bolt-holes are provided at positions shifted from the center position of each other, in the longitudinal direction of hollow member and also in the width direction perpendicular to the longitudinal direction. Hence, the hollow member is fixed by at least two bolts located diagonally to each other, and thereby the hollow member is fixed steadily. Moreover, even a relatively small hollow member can be fixed by using a plurality of bolts.

According to the first embodiment; the rupture inducing portion(s) is formed in the suspension member of vehicle. A suspension-arm supporting area of suspension member is originally designed to be reinforced in strength in order to support the suspension arm, and further comes to have a high stiffness in combination with the strength of suspension arm. However, the suspension-arm supporting area of suspension member is ruptured at the provided rupture inducing portion, between the suspension-arm supporting portion located near the vehicle interior and the vehicle-interior side (rear-end) connecting portion connected to the vehicle body, when receiving the collision energy exceeding a constant level.

Thereby, the collision energy is not transmitted into the vehicle interior (room) directly via the suspension-arm supporting area of suspension member. Namely, the collision energy is smoothly absorbed by the vehicle body (side frame).

According to the first embodiment; the side members of suspension member are formed substantially in a crank shape, namely are formed so as to make the vehicle-interior-side portion of side member lower than another-side portion of side member in the front-rear direction of vehicle. Moreover, the vehicle-interior side connecting portion and the rupture inducing portion are provided at this lower side portion of side member. Therefore, the moment arises to act downwardly about a fulcrum defined by the vehicle-interior side connecting portion, when receiving an impactive force from front or rear in the case of vehicle collision or the like. At this time, the rupture inducing portion is ruptured and the side member is certainly displaced downwardly. Accordingly, the suspension-arm supporting area of suspension member, which is designed to be reinforced in strength in order to fix the suspension arm and further which is made to have a high stiffness in combination with the strength of suspension arm itself, can not be displaced toward the vehicle-interior (side) at the time of vehicle collision. Moreover at this time, the engine is also displaced downwardly without moving toward the vehicle interior (side), since the engine is supported by the suspension member at least at the vehicle-interior side portion of engine.

According to the first embodiment; the suspension member is made of aluminium alloy. Therefore, the suspension member itself can be reduced in weight.

Inventors of the present invention suggest the following imaginative concepts in the first embodiment. Namely, suspension member's parts needed to have complicated shapes are molded by means of casting, and the other parts of the suspension member are formed by means of extrusion of aluminium alloy. Thereby, manufacturing of the suspension member is made easier. Furthermore, it is suggested that a pressure-break characteristic of the extruded material of aluminium alloy in its axial direction is used by arranging the extruded material axially in the front-rear direction of vehicle. Thereby, a function of absorbing the collision energy can be effectively produced based on the pressure-break characteristic, at the time of vehicle collision. Under such a case, the optimal connecting structure for connecting a hollow member or half hollow member with another member has been explained in the first embodiment.

Second Embodiment

A second embodiment according to the present invention will now be explained. At first, a configuration according to this embodiment will now be explained with reference to FIGS. 19-23. In this embodiment, a mounting structure of a bumper supporting member for a front bumper will be explained as one example of a mounting structure for bumper supporting member. However, the mounting (or connecting) structure for bumper supporting member in this embodiment is not limited to this, and also applicable to a mounting structure of a bumper supporting member for a rear bumper. In the examples of FIGS. 19-23, UD represents an upper direction in relation to a vehicle, LD represents a lower direction in relation to a vehicle, FD represents a front direction in relation to a vehicle, RD represents a rear direction in relation to a vehicle, and VWD represents a vehicle width direction in relation to a vehicle.

Figure 19:
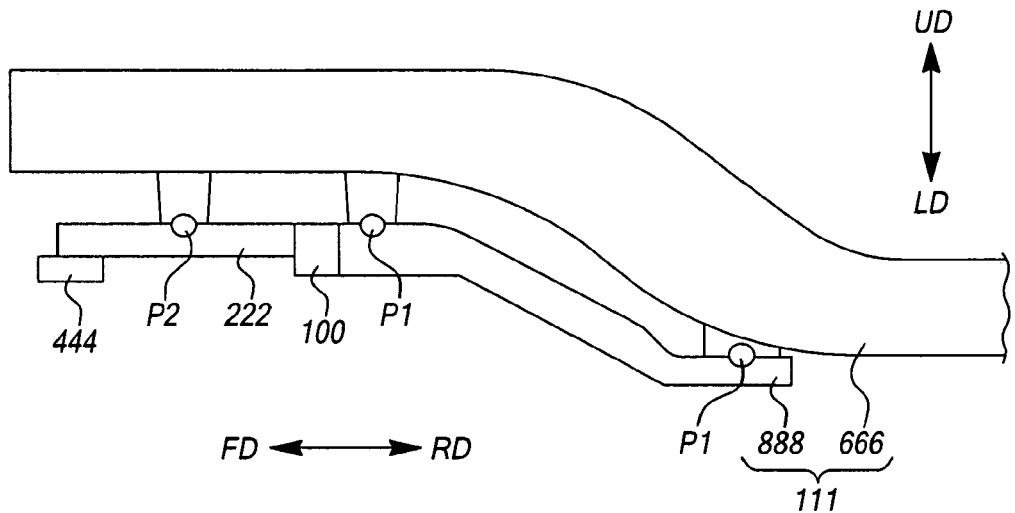
FIG. 19 is a schematic side view showing the connecting (or mounting) structure for a bumper supporting member in a second embodiment according to the present invention.

As shown in FIG. 19, in the mounting structure of bumper supporting member according to this embodiment, a bumper supporting member (or, cross member) 444 is mounted on or connected with a (vehicle) body frame 111 via a stay (or, auxiliary side-member) 222. Body frame 111 includes a side frame member (or, side frame) 666 constituting a body main portion, and a sub-frame (or, suspension member) 888. Sub-frame 888 is connected or fixed with side frame member 666 at a connecting point P1 located at the lower position of side frame member 666, and thereby is supported by side frame member 666. Sub-frame 888 includes a stay mounting portion 100 in the front side of sub-frame 888.

Stay 222 is shaped so as to extend in the front-rear direction of the vehicle. Stay 222 is connected with side frame member 666 at a connecting point P2 located at the upper position of side frame member 666, and thereby stay 222 is supported by side frame member 666. A fastening power (i.e., connecting strength) between stay 222 and side frame member 666 is lower than that between sub-frame 888 and side frame member 666. Bumper supporting member 444 is mounted or connected with stay 222, at the front side of stay 222. Moreover, stay 222 is mounted or connected with stay mounting portion 100, at the rear side of stay 222.

Stay 222, stay mounting portion 100, and sub-frame 888 are respectively formed in the following manner. Namely, the stiffness of stay 222 in the front-rear direction (i.e., stiffness acting in the front-rear direction) is lower than the stiffness of stay mounting portion 100 in the front-rear direction, and moreover the stiffness of stay mounting portion 100 in the front-rear direction is lower than the stiffness of sub-frame 888 in the front-rear direction.

Figure 20:
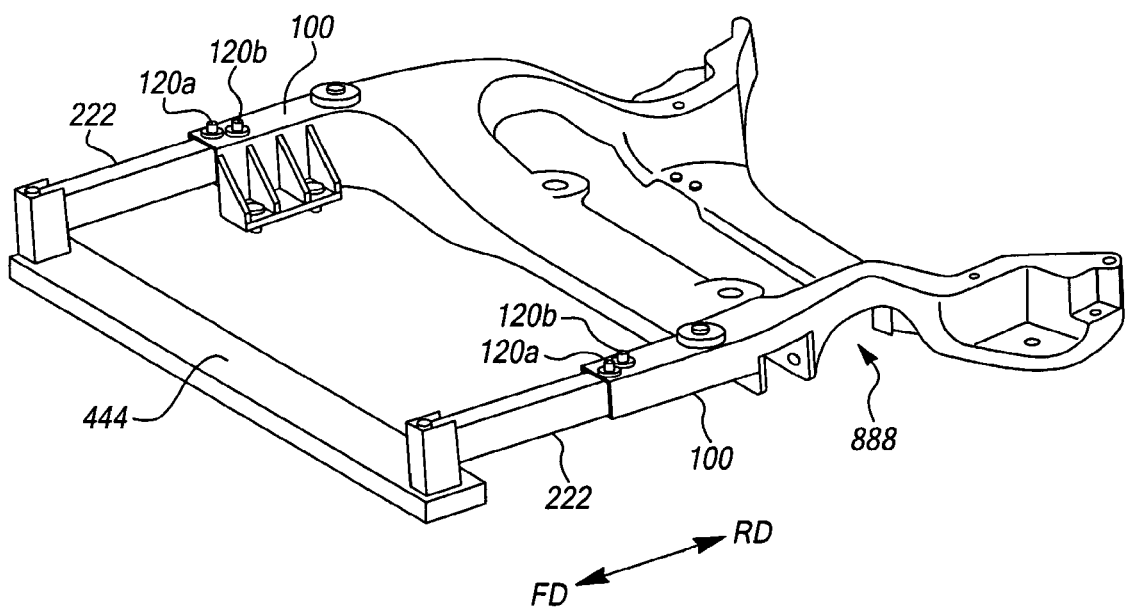
FIG. 20 is a schematic perspective view showing the connecting (or mounting) structure for the bumper supporting member in the second embodiment.

As shown in FIG. 20, the rear side of stay 222 is fixed or connected with stay mounting portion 100, by using first fastening members 120a and 120b constituting a fastening member between stay 222 and stay mounting portion 100. The detailed explanations about a connecting structure for connecting stay 222 with stay mounting portion 100 will be described later. It is noted that side frame member 666 is omitted from the illustration of FIG. 20.

Figure 21:
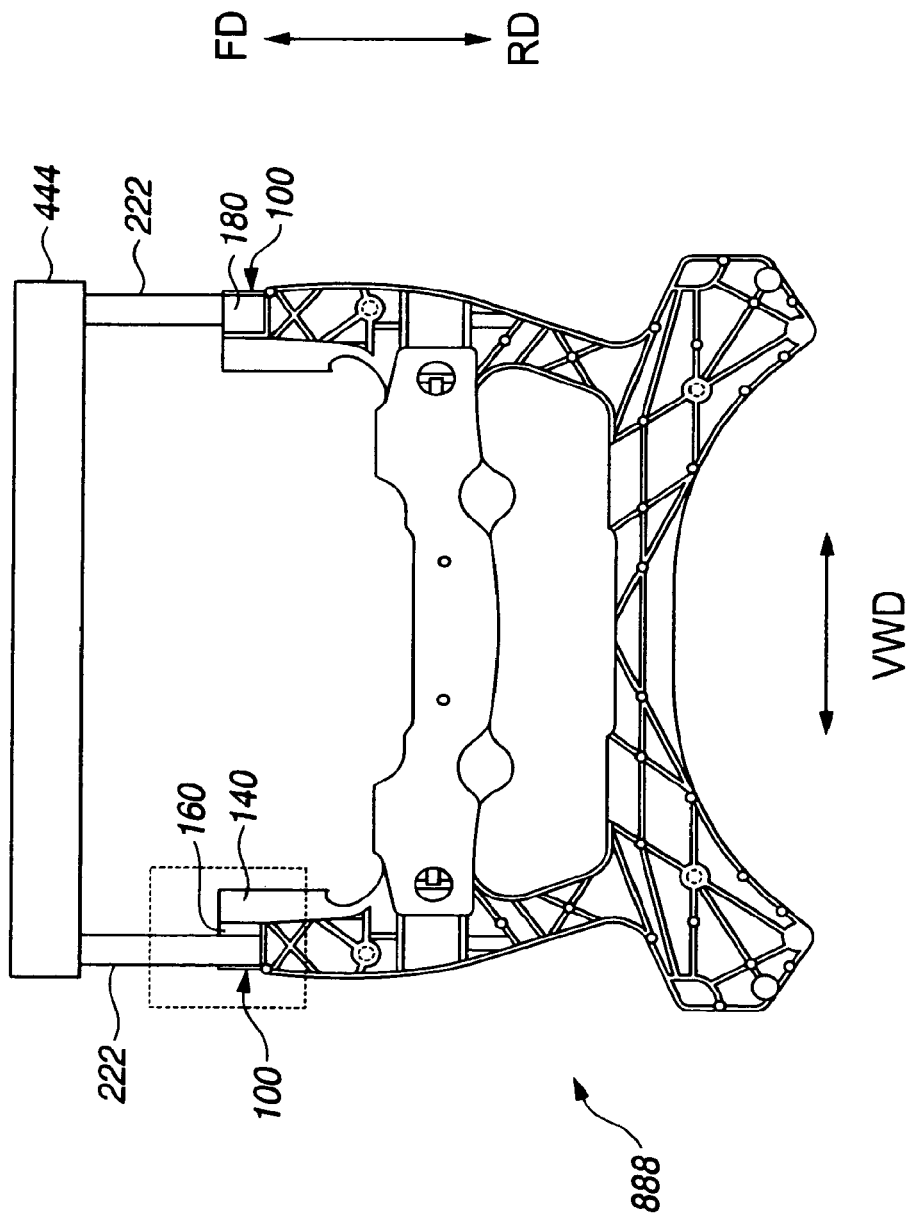
FIG. 21 is a schematic plan view showing the connecting (or mounting) structure for the bumper supporting member in the second embodiment.

As shown in FIG. 21, sub-frame 888 includes a stabilizer mounting portion 140 in proximity to (adjacent to) stay mounting portion 100. Stay mounting portion 100 is moulded integrally with sub-frame 888. Stay mounting portion 100 includes an open-cross-section portion 160 having an opening facing to the lower direction of vehicle with respect to the upper-lower direction of the vehicle. The rear side of stay 222 is inserted inside open-cross-section portion 160. Moreover, the opening of open-cross-section portion 160 is enclosed or covered by an enclosing member 180. In FIG. 21, the state where only a right-side one of two openings of both open-cross-section portions 160 has been enclosed by enclosing member 180 is illustrated for the sake of explanation. It is noted that side frame member 666 is omitted from the illustration of FIG. 21.

Figure 22:
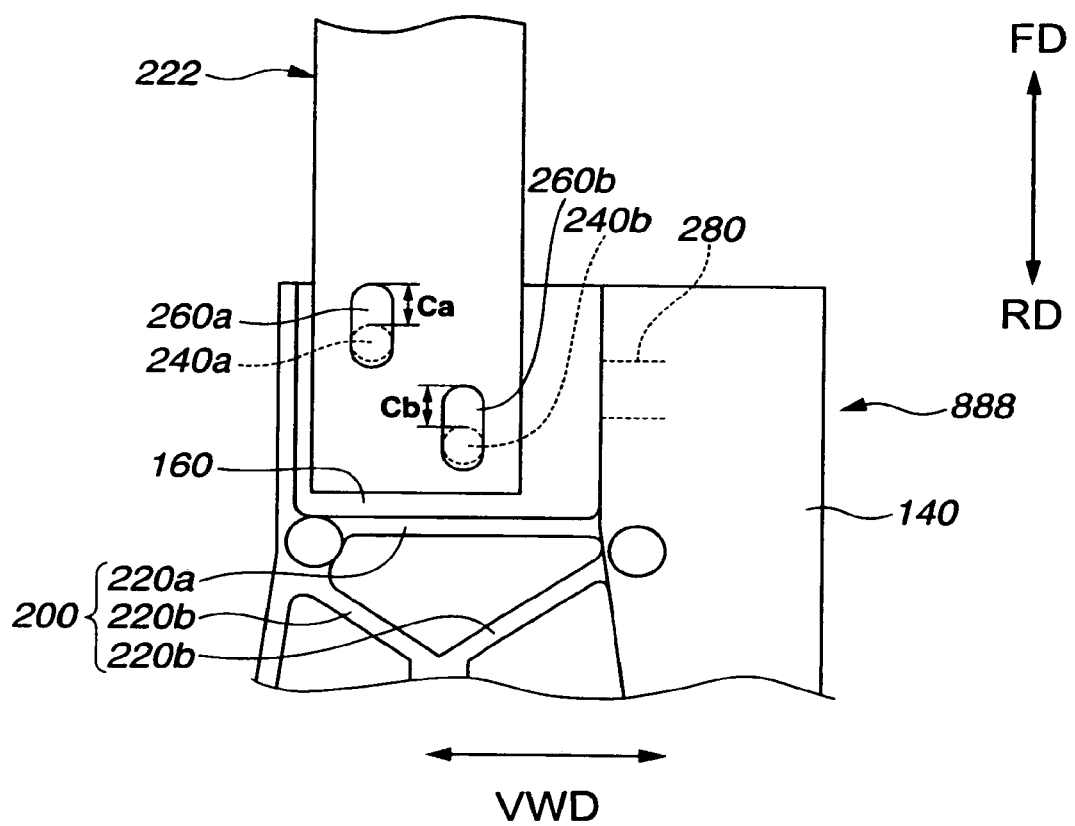
FIG. 22 is an enlarged view of a region surrounded by a dotted line in FIG. 21.

Sub-frame 888 overlaps with stay(s) 222 relative to the front-rear direction of vehicle, at least in a part of sub-frame 888. Sub-frame 888 includes a stopper portion(s) 200, at a position posterior to (i.e., in rear-directional area from) stay mounting portion 100, namely at a sub-frame 888's position closer to a vehicle-interior than stay mounting portion 100. Each of both stopper portions 200 includes a plurality of boards (or, board member) 220 moulded integrally with sub-frame 888, as shown in FIG. 22. Boards 220 include a parallel board 220a substantially parallel to a width direction (lateral direction) of vehicle, and an inclined board 220b inclined relative to the width direction of vehicle.

The detailed explanations about the connecting structure for connecting stay 222 with stay mounting portion 100 will now be described with reference to FIGS. 22 and 23. FIG. 22 is a partially enlarged view of an area surrounded by dotted line in FIG. 21. As shown in FIG. 22, the open-cross-section portion 160's part entirely overlapping with stay 222 as viewed in the upper-lower direction of vehicle has two stay-locating holes (or through holes) 240a and 240b. Each of stay-locating holes 240a and 240b passes or penetrates through open-cross-section portion 160 in the upper-lower direction. Two stay-locating holes 240a and 240b are shifted (offset) from each other, in the front-rear direction of vehicle and also in the width direction of vehicle.

Stay 222's parts overlapping with two stay-locating holes 240a and 240b as viewed in the upper-lower direction have (are formed with) respectively corresponding stay-mounting holes (or bolt holes) 260a and 260b. Each of stay-mounting holes 260a and 260b passes or penetrates through stay 222 (or wall of stay 222) in the upper-lower direction. Each of two stay-mounting holes 260a and 260b is elongated or slotted in the front-rear direction of vehicle. An opening space (hole size) of each of stay-mounting holes 260a and 260b is larger than an opening space (hole size) of corresponding stay-locating hole 240a or 240b, with respect to the front-rear direction of vehicle. Stay-mounting hole 260a is placed so as to overlap with stay-locating hole 240a as viewed in the upper-lower direction; and so as to provide a gap Ca between stay-mounting hole 260a and stay-locating hole 240a at the front side of stay-mounting hole 260a, as viewed in the upper-lower direction. Namely, a front-rear directional size of stay-mounting hole 260a measured from a front end of stay-locating hole 240a toward bumper supporting member 444 (i.e., in the front direction) represents gap Ca. Stay-mounting hole 260b is placed so as to overlap with stay-locating hole 240b as viewed in the upper-lower direction; and so as to provide a gap Cb between stay-mounting hole 260b and stay-locating hole 240b at the front side of stay-mounting hole 260b, as viewed in the upper-lower direction. Namely, a front-rear directional size of stay-mounting hole 260b measured from a front end of stay-locating hole 240b toward bumper supporting member 444 (i.e., in the front direction) represents gap Cb. Accordingly also, two stay-mounting holes 260a and 260b are shifted (offset) from each other, in the front-rear direction of vehicle and in the width direction of vehicle. In addition, a sub-frame 888's part entirely overlapping with enclosing member 180 as viewed in the width direction of vehicle has a body-frame-side locating hole 280 opening toward enclosing member 180.

FIG. 23 shows the state where the opening of open-cross-section portion 160 shown in FIG. 22 has been enclosed or covered by enclosing member 180, namely the state where enclosing member 180 has covered the left open-cross-section portion 160 of FIG. 21 to become like the right open-cross-section portion 160 of FIG. 21. As shown in FIG. 23, enclosing member 180 is formed substantially in an L shape, as a whole. Enclosing member 180's parts overlapping with two stay-mounting holes 260a and 260b as viewed in the upper-lower direction of vehicle have (are formed with) respectively corresponding stay-side mounting holes 300a and 300b passing through enclosing member 180 in the upper-lower direction. An enclosing member 180's part overlapping with body-frame-side locating hole 280 as viewed in the width direction of vehicle has a body-frame-side mounting hole 320 passing through enclosing member 180 in the width direction of vehicle. Stay-side mounting hole 300a is located or provided at a position at which stay-side mounting hole 300a overlaps with stay-locating hole 240a as viewed in the upper-lower direction of vehicle, namely is provided at approximately same position as stay-locating hole 240a relative to the front-rear and width directions. Stay-side mounting hole 300b is located or provided at a position at which stay-side mounting hole 300b overlaps with stay-locating hole 240b as viewed in the upper-lower direction of vehicle, namely is provided at approximately same position as stay-locating hole 240b relative to the front-rear and width directions. Accordingly, also, two stay-side mounting holes 300a and 300b are shifted (offset) from each other, in the front-rear direction and in the width direction of vehicle.

Therefore, stay-locating hole 240a overlaps with stay-mounting hole 260a, and stay-mounting hole 260a overlaps with stay-side mounting hole 300a, as viewed in the upper-lower direction of vehicle. Namely, stay-locating hole 240a, stay-mounting hole 260a, and stay-side mounting hole 300a overlap one another as viewed in the upper-lower direction of vehicle. Accordingly, stay 222, sub-frame 888, and enclosing member 180 are connected or fastened with one another, by first fastening member 120a passing or penetrating through stay-locating hole 240a, stay-mounting hole 260a, and stay-side mounting hole 300a. Similarly, stay-locating hole 240b overlaps with stay-mounting hole 260b, and stay-mounting hole 260b overlaps with stay-side mounting hole 300b, as viewed in the upper-lower direction of vehicle. Namely, stay-locating hole 240b, stay-mounting hole 260b, and stay-side mounting hole 300b overlap one another as viewed in the upper-lower direction of vehicle. Accordingly, stay 222, sub-frame 888, and enclosing member 180 are connected or fastened with one another, by first fastening member 120b passing or penetrating through stay-locating hole 240b, stay-mounting hole 260b, and stay-side mounting hole 300b.

Since gap Ca is provided between stay-mounting hole 260a and stay-locating hole 240a on front side of stay-mounting hole 260a as viewed in the upper-lower direction, a gap (not shown) having the same front-rear length as gap Ca is provided or formed between stay-mounting hole 260a and first fastening member 120a on front side of stay-mounting hole 260a. Similarly, since gap Cb is provided between stay-mounting hole 260b and stay-locating hole 240b on front side of stay-mounting hole 260b as viewed in the upper-lower direction, a gap (not shown) having the same front-rear length as gap Cb is provided or formed between stay-mounting hole 260b and first fastening member 120b on front side of stay-mounting hole 260b.

Enclosing member 180 is connected or fastened with body frame 111 (sub-frame 888), by a second fastening member 340 passing through body-frame-side locating hole 280 and body-frame-side mounting hole 320. At least a part of enclosing member 180's portion entirely overlapping with stay 222 as viewed in the upper-lower direction of vehicle abuts on stay 222 to be pressed against stay 222 (i.e., press-contacts with stay 222), by fastening stay 222, stay mounting portion 100, and enclosing member 180 by means of first fastening members 120a and 120b.

Next, operations and advantages according to this embodiment will now be explained. When the vehicle collides with an obstacle or the like during a running of vehicle, a collision energy Ec is inputted to bumper supporting member 444 from the front (or rear) of vehicle. As mentioned above, the stiffness of stay 222 in the front-rear direction is lower than the stiffness of stay mounting portion 100 in the front-rear direction, moreover the stiffness of stay mounting portion 100 in the front-rear direction is lower than the stiffness of sub-frame 888 in the front-rear direction, and moreover the fastening power between stay 222 and side frame member 666 is lower than that between sub-frame 888 and side frame member 666. Hence at first, collision energy Ec is transferred to stay 222 which has the lowest stiffness (acting) in the front-rear direction. Then, collision energy Ec transferred to stay 222 is absorbed by a deformation caused in stay 222.

In the case where the deformation of stay 222 has failed to absorb all of collision energy Ec, a residual energy (of collision energy Ec) Eo1 which has not been absorbed by the deformation of stay 222 is transmitted to a stay 222's mounting portion for connecting with stay mounting portion 100. Accordingly, residual energy Eo1 displaces or moves stay 222 in the rear direction of vehicle. As mentioned above, the gap having the same front-rear length as gap Ca is provided between stay-mounting hole 260a and first fastening member 120a on front side of stay-mounting hole 260a, and moreover the gap having the same front-rear length as gap Cb is provided between stay-mounting hole 260b and first fastening member 120b on front side of stay-mounting hole 260b. Therefore, stay 222 is displaced by residual energy Eo1, in the rear direction by the front-rear directional length of gap Ca or Cb. At the same time; stay-mounting hole 260a and first fastening member 120a slide in contact with each other so as to generate a friction (resistance) therebetween, moreover stay-mounting hole 260b and first fastening member 120b slide in contact with each other so as to generate a friction therebetween, and moreover stay 222 slides in contact with each of sub-frame 888 and enclosing member 180 so as to each generate a friction therebetween. Thereby, residual energy Eo1 can be absorbed.

In the case where the displacement of stay 222 has failed to absorb all of residual energy Eo1, and stay mounting portion 100 is deformed and then stay 222 collides with stopper portion 200; a residual energy (of residual energy Eo1) Eo2 which has not been absorbed by the displacement of stay 222 is transmitted to stopper portion 200. Stopper portion 200 is deformed by this collision between stay 222 and stopper portion 200, and thereby residual energy Eo2 is absorbed.

In the case where the deformation of stopper portion 200 has failed to absorb all of residual energy Eo2, a residual energy (of residual energy Eo2) Eo3 which has not been absorbed by the deformation of stopper portion 200 is transmitted to sub-frame 888. Sub-frame 888 is deformed, and thereby residual energy Eo3 is absorbed. In the case where the deformation of sub-frame 888 has failed to absorb all of residual energy Eo3, a residual energy (of residual energy Eo3) Eo4 which has not been absorbed by the deformation of sub-frame 888 is transmitted to connecting point P1. Accordingly side frame member 666 is deformed, and thereby residual energy Eo4 is absorbed.

Therefore in the mounting (or connecting) structure for bumper supporting member according to this embodiment; the collision energy is transmitted to side frame member 666 after the collision energy is absorbed by stay 222, stay mounting portion 100, stopper portion 200, and sub-frame 888 in this order, when the collision energy is inputted to bumper supporting member 444 from the front (or rear) of vehicle. As a result, the collision energy which is transmitted to side frame member 666 can be reduced. If the caused collision energy is low; the collision energy transmitted to side frame member 666 does not reach a degree to deform side frame member 666, and hence the deformation of side frame member 666 can be prevented. If the caused collision energy is still low; the collision energy transmitted to sub-frame 888 does not reach a degree to deform sub-frame 888, and hence the deformation of sub-frame 888 and side frame member 666 can be prevented.

In the mounting (or connecting) structure according to this embodiment; for example when a pedestrian collides with the vehicle, the pedestrian receives an impact from the vehicle, namely from bumper supporting member 444, stay 222, stay mounting portion 100, stopper portion 200, and sub-frame 888 in this order. At this time, the impactive energy is successively absorbed in these parts, namely in bumper supporting member 444, stay 222, stay mounting portion 100, stopper portion 200, and sub-frame 888. Hence, "Compatibility" can be improved. What the word "Compatibility" means is that an automotive vehicle, a motorcycle, and a pedestrian having an unequal size to one another respectively ensure their safety. Mainly, the word "Compatibility" means a strength enhancement for a small-size vehicle, and a harm reduction for a large-size vehicle.

In the mounting structure according to this embodiment; an excessive collision energy can be handled without upsizing first fastening member 120 and second fastening member 340 in diameter and without enhancing the strength of their bearing surfaces. A flexibility in layout can be improved. Moreover in the mounting structure according to this embodiment; each of two stay-locating holes 240a and 240b, two stay-mounting holes 260a and 260b, and two stay-side mounting holes 300a and 300b are offset from each other, in the front-rear direction of vehicle. Therefore, the stiffness against a power inputted to stay 222 in the width direction of vehicle is enhanced.

Moreover in the mounting structure according to this embodiment; each of two stay-locating holes 240a and 240b, two stay-mounting holes 260a and 260b, and two stay-side mounting holes 300a and 300b are offset from each other, in the width direction of vehicle. Accordingly when providing a plurality of holes in each of stay 222, stay mounting portion 100, and enclosing member 180; the plurality of holes do not need to be formed in the front-rear direction of vehicle, and thereby the flexibility in layout can be improved.

Moreover in the mounting structure according to this embodiment; stay mounting portion 100 is moulded integrally with sub-frame 888 and includes open-cross-section portion 160 having the opening facing in the lower direction of vehicle. Thereby, the stiffness of stabilizer mounting portion 140 is enhanced, and a roll stiffness at the time of vehicle turning is also enhanced. Additionally, a shape forming (molding) of sub-frame 888 is easy to be conducted as compared to the case where stay mounting portion 100 includes a closed-cross-section portion forming a hollow-and-closed cross section as viewed in the front-rear direction. Accordingly, a productivity and an accuracy in molding are improved.

Moreover in the mounting structure according to this embodiment; the opening of open-cross-section portion 160 is enclosed by enclosing member 180. Thereby, the stiffness of stabilizer mounting portion 140 is enhanced. Furthermore, since the fastening power between stay 222 and stay mounting portion 100 and the fastening power between stay 222 and enclosing member 180 are enhanced (i.e., fastening power among stay 222, stay mounting portion 100, and enclosing member 180 is enhanced), the stiffness against the stay 222's displacement caused in the upper-lower direction of vehicle at the time of collision of the vehicle is enhanced. Moreover in the mounting structure according to this embodiment; enclosing member 180 is fastened with sub-frame 888, by second fastening member 340. Thereby, the fastening power among stay 222, stay mounting portion 100, and enclosing member 180 is enhanced.

In the above-described second embodiment; the case where stay 222, stay mounting portion 100, and sub-frame 888 are formed in such a manner that the stiffness of stay 222 is lower than the stiffness of stay mounting portion 100 in the front-rear direction, and moreover the stiffness of stay mounting portion 100 is lower than the stiffness of sub-frame 888 in the front-rear direction has been explained. However, the mounting (or connecting) structure according to this embodiment is not limited to this. Namely, it is only necessary to form stay 222, stay mounting portion 100, and sub-frame 888 in such a manner that the stiffness of stay 222 and the stiffness of stay mounting portion 100 in the front-rear direction are respectively lower than the stiffness of sub-frame 888 in the front-rear direction. Hence, respective stay 222 and stay mounting portion 100 may be formed so that the stiffness of stay mounting portion 100 is lower than the stiffness of stay 222 with respect to the front-rear direction. Additionally, respective stay 222 and stay mounting portion 100 may be formed so that the stiffness of stay mounting portion 100 is equal to the stiffness of stay 222 in the front-rear direction.

In the above-described second embodiment; the case where body frame 111 includes side frame member 666 and sub-frame 888 has been explained. However, the mounting (or connecting) structure according to this embodiment is not limited to this. Namely, body frame 111 does not need to include sub-frame 888, instead in such a case, side frame member 666 may include stay mounting portion 100. In the above-described second embodiment; the case where sub-frame 888 includes stopper portion(s) 200 has been explained. However, the mounting structure according to this embodiment is not limited to this. Namely, sub-frame 888 does not need to include stopper portion(s) 200.

In the above-described second embodiment; the case where the shape of stay-mounting hole 260 is formed to be elongated or extended in the front-rear direction of vehicle has been explained. However, the mounting structure according to this embodiment is not limited to this. Namely, the shape of stay-mounting hole 260 may be formed like the shape of stay-locating hole 240. In the above-described second embodiment; the case where two stay-locating holes 240*a* and 240*b*, two stay-mounting holes 260*a* and 260*b*, and two stay-side mounting holes 300*a* and 300*b* are respectively provided has been explained. However, the mounting structure according to this embodiment is not limited to this. Namely, one stay-locating hole 240*a* or 240*b*, one stay-mounting hole 260*a* or 260*b*, and one stay-side mounting hole 300*a* or 300*b* may be respectively provided. Alternatively, three or more stay-locating holes 240*a*, 240*b*, . . . , three or more stay-mounting holes 260*a*, 260*b*, . . . , and three or more stay-side mounting holes 300*a*, 300*b*, . . . may be respectively provided. In such a case, it is favorable that at least two among three or more provided holes are offset from each other in the front-rear direction of vehicle and also in the width direction of vehicle.

In the above-described second embodiment; the case where each of two stay-locating holes 240*a* and 240*b*, two stay-mounting holes 260*a* and 260*b*, and two stay-side mounting holes 300*a* and 300*b* are offset (or shifted) from each other, in the front-rear direction of vehicle and in the width direction of vehicle has been explained. However, the mounting structure according to this embodiment is not limited to this. Namely, each of two stay-locating holes 240*a* and 240*b*, two stay-mounting holes 260*a* and 260*b*, and two stay-side mounting holes 300*a* and 300*b* may be formed so as to overlap with each other as viewed in at least one direction of the front-rear direction and the width direction.

In the above-described second embodiment; the case where stay mounting portion 100 is moulded integrally with sub-frame 888, and stay mounting portion 100 includes open-cross-section portion 160 having the opening facing to the lower direction of vehicle has been explained. However, the mounting structure according to this embodiment is not limited to this. Namely, stay mounting portion 100 is moulded integrally with sub-frame 888, and stay mounting portion 100 may include a closed-cross-section portion forming a hollow-and-closed cross section as viewed in the front-rear direction. In such a case, in addition to the enhancement of stiffness of stay mounting portion 100, the stiffness of stabilizer mounting portion 140 provided adjacent to stay mounting portion 100 is enhanced.

In the above-described second embodiment; the case where open-cross-section portion 160 is formed with the opening which faces to the lower direction of vehicle has been explained. However, the mounting structure according to this embodiment is not limited to this. Namely, the opening direction of the opening does not need to be the lower direction of vehicle, and moreover open-cross-section portion 160 may be formed with a plurality of openings. In the above-described second embodiment; the case where the opening of open-cross-section portion 160 is enclosed by enclosing member 180 has been explained. However, the mounting structure according to this embodiment is not limited to this. Namely, there is possibly no need to enclose the opening of open-cross-section portion 160. In the above-described second embodiment; the case where stay mounting portion 100 includes open-cross-section portion 160 has been explained. However, the mounting structure according to this embodiment is not limited to this. Namely for example, stay mounting portion 100 may be formed in a plate shape extending in the front-rear direction.

In the above-described second embodiment; the case where stay 222, sub-frame 888, and enclosing member 180 are fastened with one another by first fastening member 120*a*, 120*b* passing through stay-locating hole 240*a*, 240*b*, stay-mounting hole 260*a*, 260*b*, and stay-side mounting hole 300*a*, 300*b* has been explained. However, the mounting structure according to this embodiment is not limited to this. Namely for example, stay 222 may be fastened or connected with sub-frame 888 by means of welding, and also stay 222 may be fastened or connected with enclosing member 180 by means of welding. Moreover, it is conceivable that stay 222 is fastened with sub-frame 888 by first fastening member 120*a*, 120*b* passing through two of stay-locating hole 240*a*, 240*b* and stay-mounting hole 260*a*, 260*b*, and then stay 222 is fastened with enclosing member 180 by a third fastening member (not shown) passing through two of stay-mounting hole 260*a*, 260*b* and stay-side mounting hole 300*a*, 300*b*. In the above-described second embodiment; the case where enclosing member 180 is fastened with sub-frame 888 by second fastening member 340 has been explained. However, the mounting structure according to this embodiment is not limited to this. Namely for example, enclosing member 180 may be fastened or connected with sub-frame 888 by means of welding.

In the above-described first and second embodiments; the case where the suspension member (or sub-frame) according to the present invention is applied to a front-engine vehicle has been explained. However, the connecting (or mounting) structure according to the first and second embodiments is not limited to this. Namely, the suspension member (or sub-frame) according to the present invention is also applicable to a rear-engine vehicle.

In the above-described first and second embodiments; the case where the connecting (or mounting) structure according to the present invention is applied to the suspension member (or sub-frame) has been explained. However, the connecting (or mounting) structure according to the present invention is also applicable to the other structural materials e.g., in architecture or in civil engineering.

This application is based on prior Japanese Patent Applications No. 2005-180121 filed on Jun. 21, 2005, No. 2005-180850 filed on Jun. 21, 2005, and No. 2005-173480 filed on Jun. 14, 2005. The entire contents of these Japanese Patent Applications are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A connecting structure comprising:
   a hollow or half hollow member, the hollow or half hollow member having a plurality of sides including two side portions opposed apart to each other and a linking portion linking the two side portions;
   a collar including two contact surfaces at both ends of the collar, the two contact surfaces respectively abutting the two side portions between the two side portions of the hollow or half hollow member, at least one of the two contact surfaces being formed with a receiving portion therein;
   the collar including a bolt-hole that passes through the two contact surfaces and a rotation prevention portion, the collar being disposed between the two side portions of the hollow or half hollow member;
   the hollow or half hollow member including a deformed portion formed in at least one of the two side portions that joins the collar with the hollow or half hollow member, the deformed portion extending into the receiving portion;
   an another member including a hole;
   a bolt that passes through a hole in each of the two side portions, the bolt-hole of the collar, and the hole of the another member so as to connect a portion of the hollow or half hollow member within the another member; and
   the rotation prevention portion of the collar configured to make contact with the linking portion so as not to allow the collar to rotate about the deformed portion beyond a constant tolerance before the collar is fastened by the bolt.

2. The connecting structure as claimed in claim 1, wherein the collar is temporarily joined to the hollow or half hollow member before the hollow or half hollow member is fastened with the another member by the bolt.

3. The connecting structure as claimed in claim 1, wherein the rotation prevention portion is configured to come in contact with a linking portion linking the two side portions with each other, so as to prevent a rotation of the collar about the deformed portion.

4. The connecting structure as claimed in claim 3, wherein the rotation prevention portion prevents the rotation by coming in contact with the linking portion by surface contact.

5. The connecting structure as claimed in claim 1, wherein the hollow or half hollow member is substantially in a form of a rectangular tube or a half rectangular tube, and the two side portions are mutually-opposed two walls among four walls defining the rectangular tube or among three walls defining the half rectangular tube.

6. The connecting structure as claimed in claim 1, wherein;
   the collar is formed by an extrusion of an aluminum alloy, the receiving portion is defined by a through-hole, and the through-hole and the bolt-hole are formed in the extruded aluminum alloy.

7. The connecting structure as claimed in claim 1, wherein the collar is formed with a plurality of bolt-holes including said bolt-hole.

8. The connecting structure as claimed in claim 7, wherein at least two of the plurality of bolt-holes are located at positions which are shifted from a center position of each other, in a longitudinal direction of the hollow or half hollow member and also in a width direction perpendicular to the longitudinal direction.

9. The connecting structure as claimed in claim 1, wherein the collar is formed with a plurality of elongated bolt-holes including said bolt-hole.

10. The connecting structure as claimed in claim 9, wherein at least two of the plurality of elongated bolt-holes are provided at positions which are shifted from a center position of each other, in a longitudinal direction of the hollow or half hollow member and also in a width direction perpendicular to the longitudinal direction.

11. The connecting structure as claimed in claim 1, wherein the collar includes bolt-holes for two different bolts that pass through corresponding holes of the side portions of the hollow or half hollow member and corresponding holes of the another member.

* * * * *